July 12, 1932.  J. R. PEIRCE  1,867,025
COMBINATIONAL HOLE PUNCH
Filed April 7, 1930   23 Sheets-Sheet 1

FIG.I.

Inventor
J. R. Peirce
Attorney
W. M. Wilson

July 12, 1932.   J. R. PEIRCE   1,867,025
COMBINATIONAL HOLE PUNCH
Filed April 7, 1930   23 Sheets-Sheet 2

Inventor
J. R. Peirce
Attorney
W. M. Wilson

July 12, 1932.   J. R. PEIRCE   1,867,025
COMBINATIONAL HOLE PUNCH
Filed April 7, 1930   23 Sheets-Sheet 6

Inventor
J. R. Peirce
By his Attorney
Wm Wilson

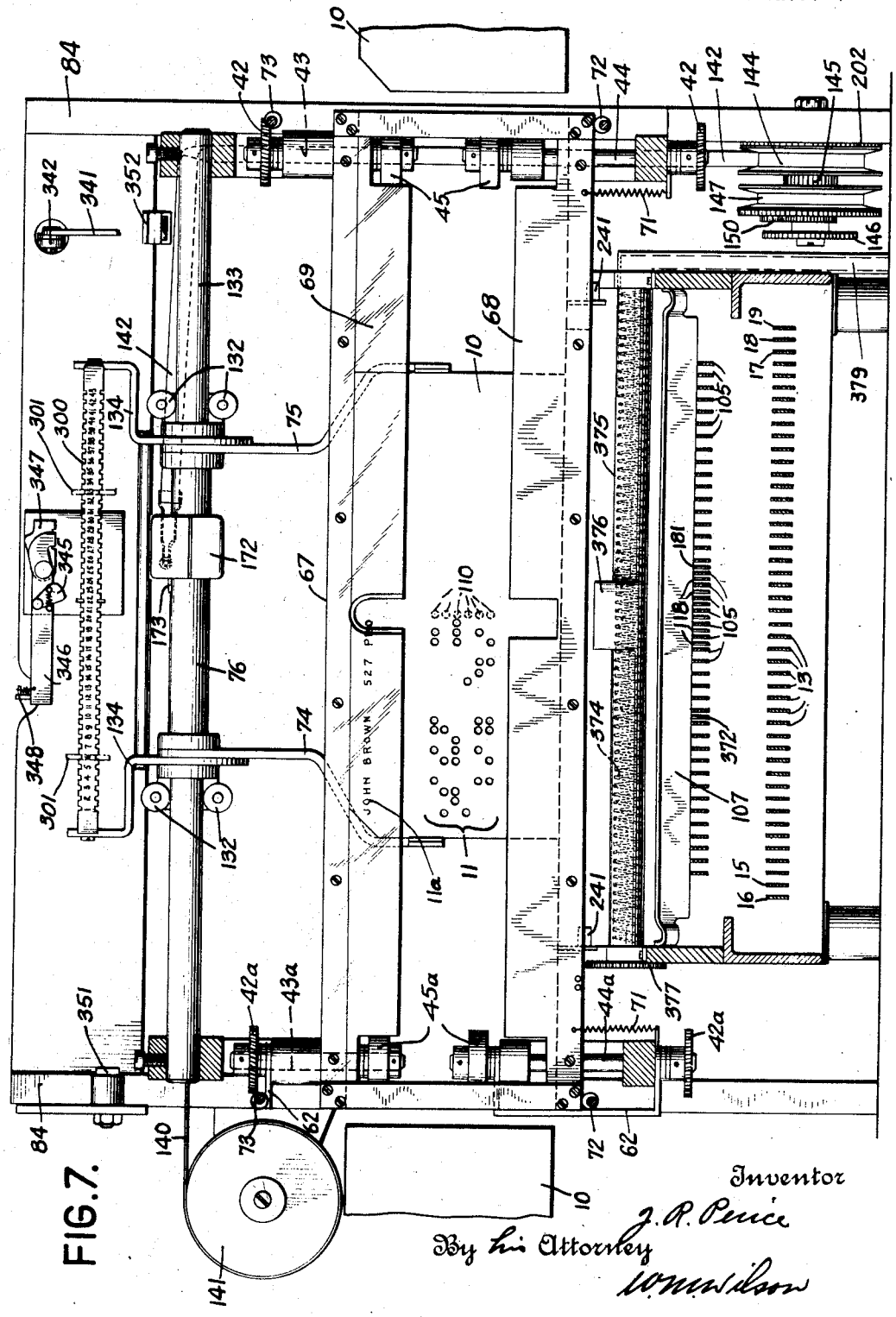

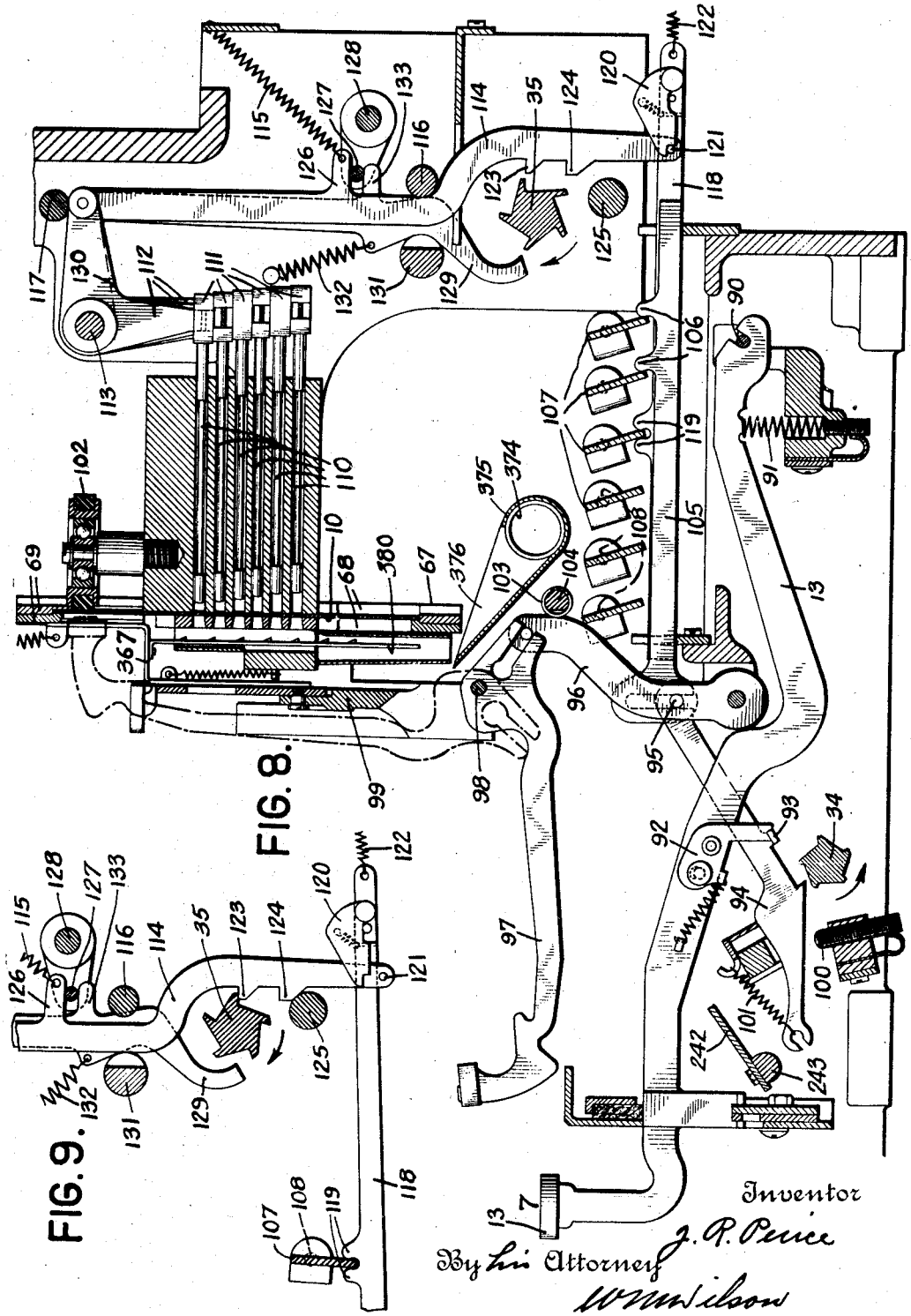

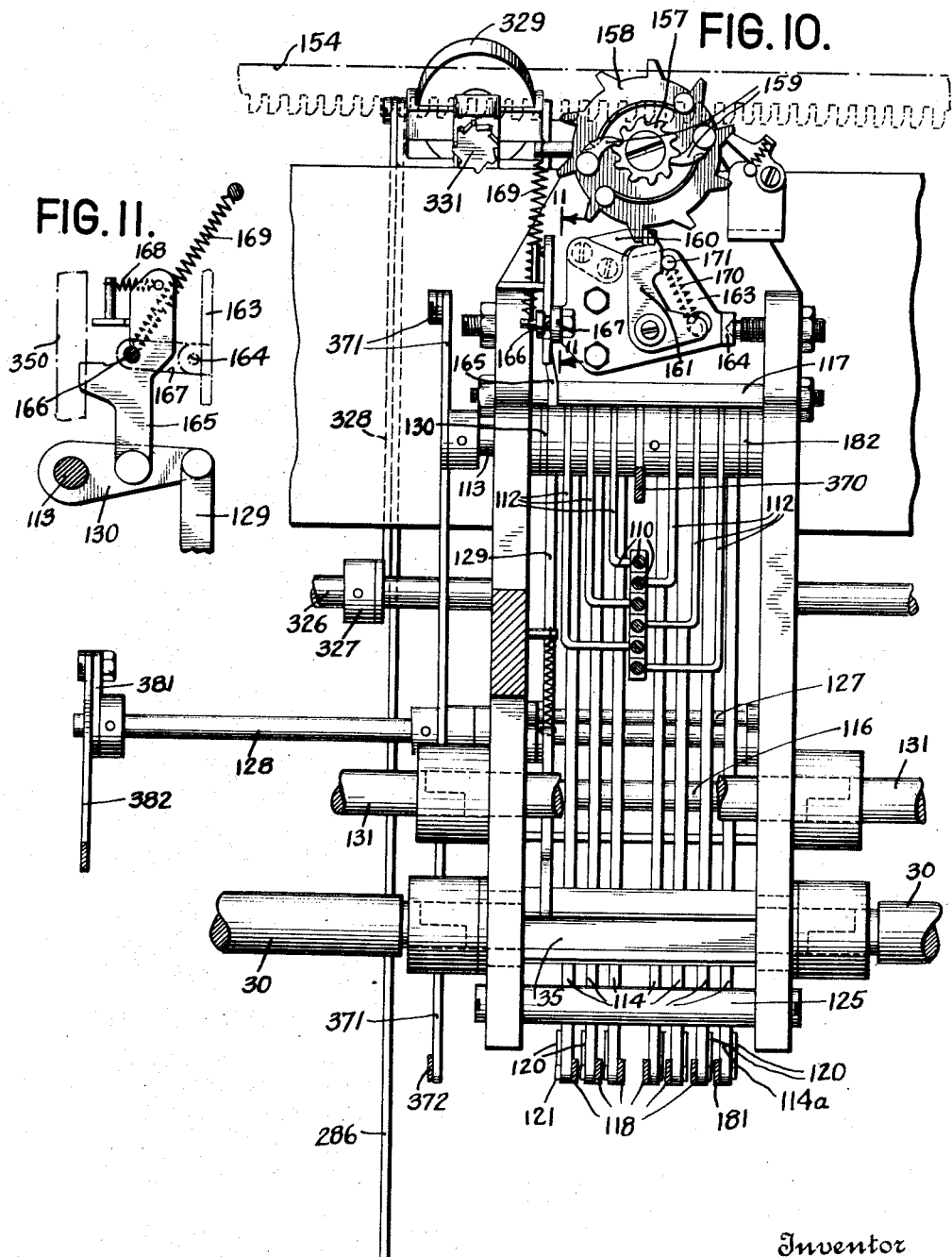

July 12, 1932.  J. R. PEIRCE  1,867,025
COMBINATIONAL HOLE PUNCH
Filed April 7, 1930   23 Sheets-Sheet 10
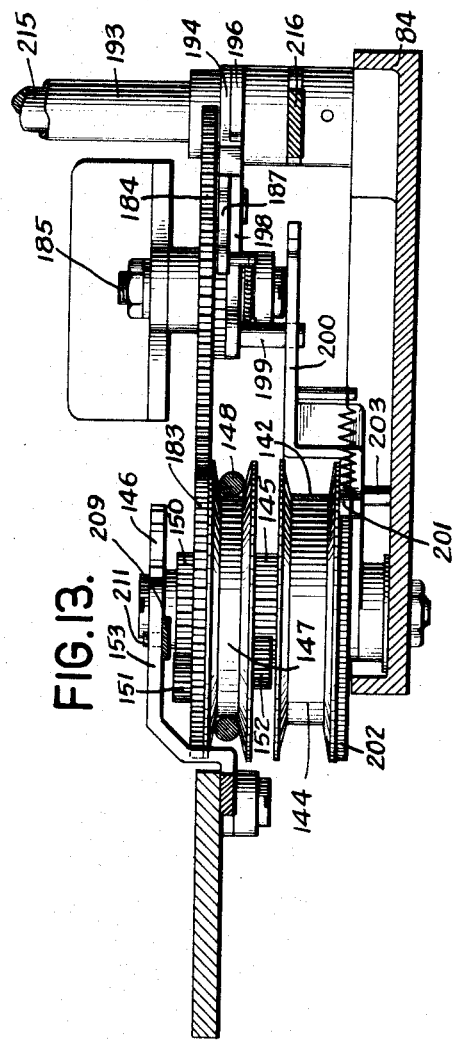
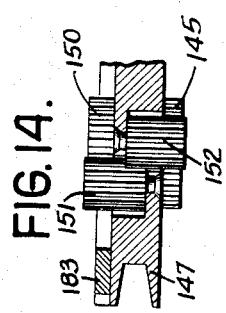
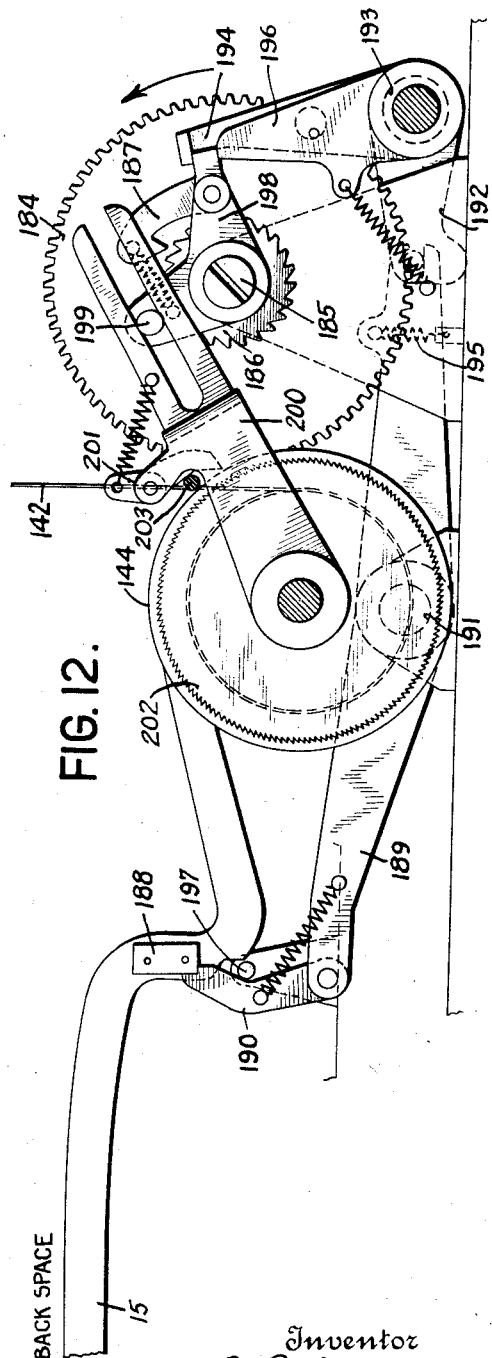
Inventor
J. R. Peirce
By his Attorney July 12, 1932.  J. R. PEIRCE  1,867,025
COMBINATIONAL HOLE PUNCH
Filed April 7, 1930   23 Sheets-Sheet 11

Inventor
J. R. Peirce
By his Attorney
W. M. Wilson

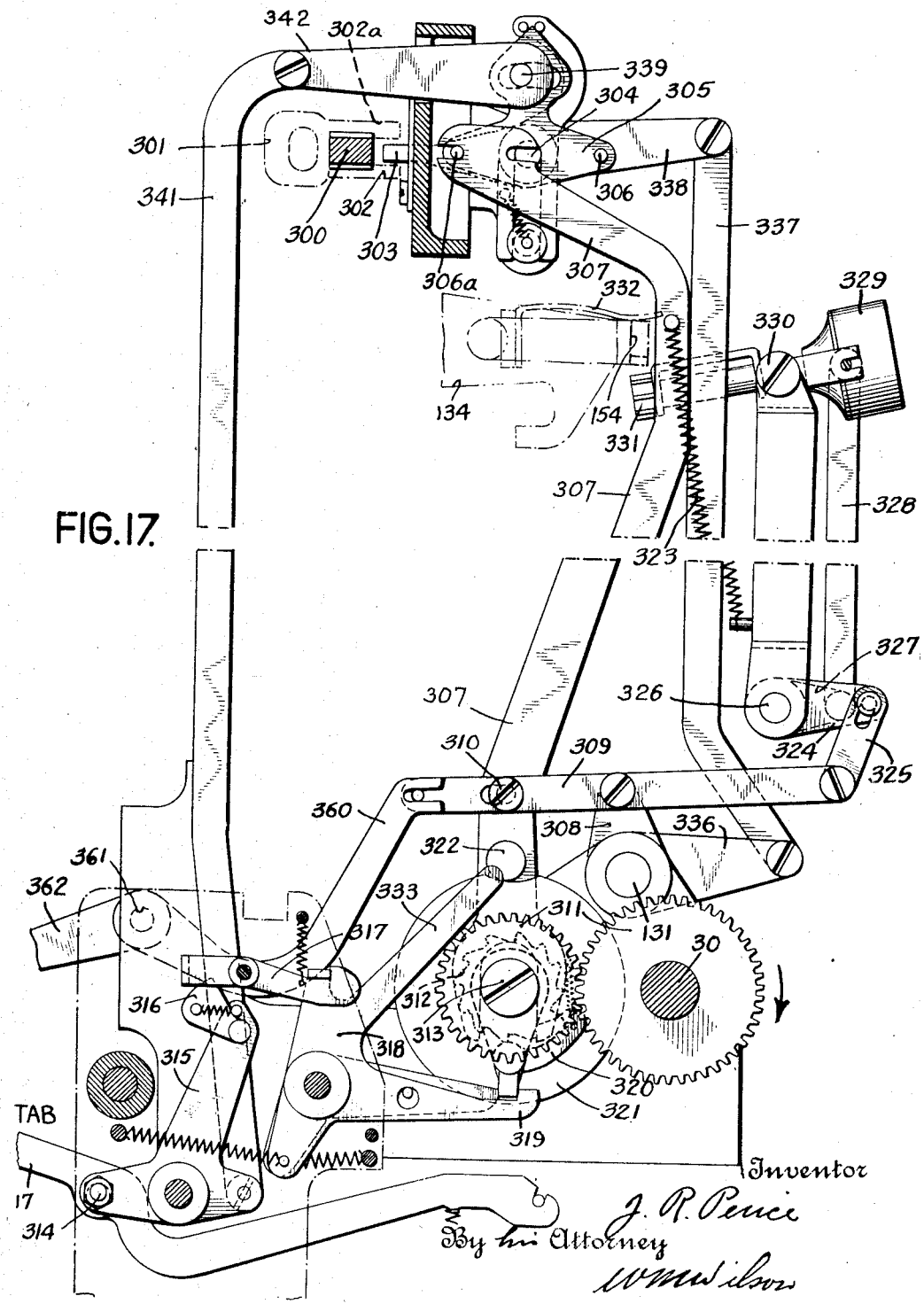

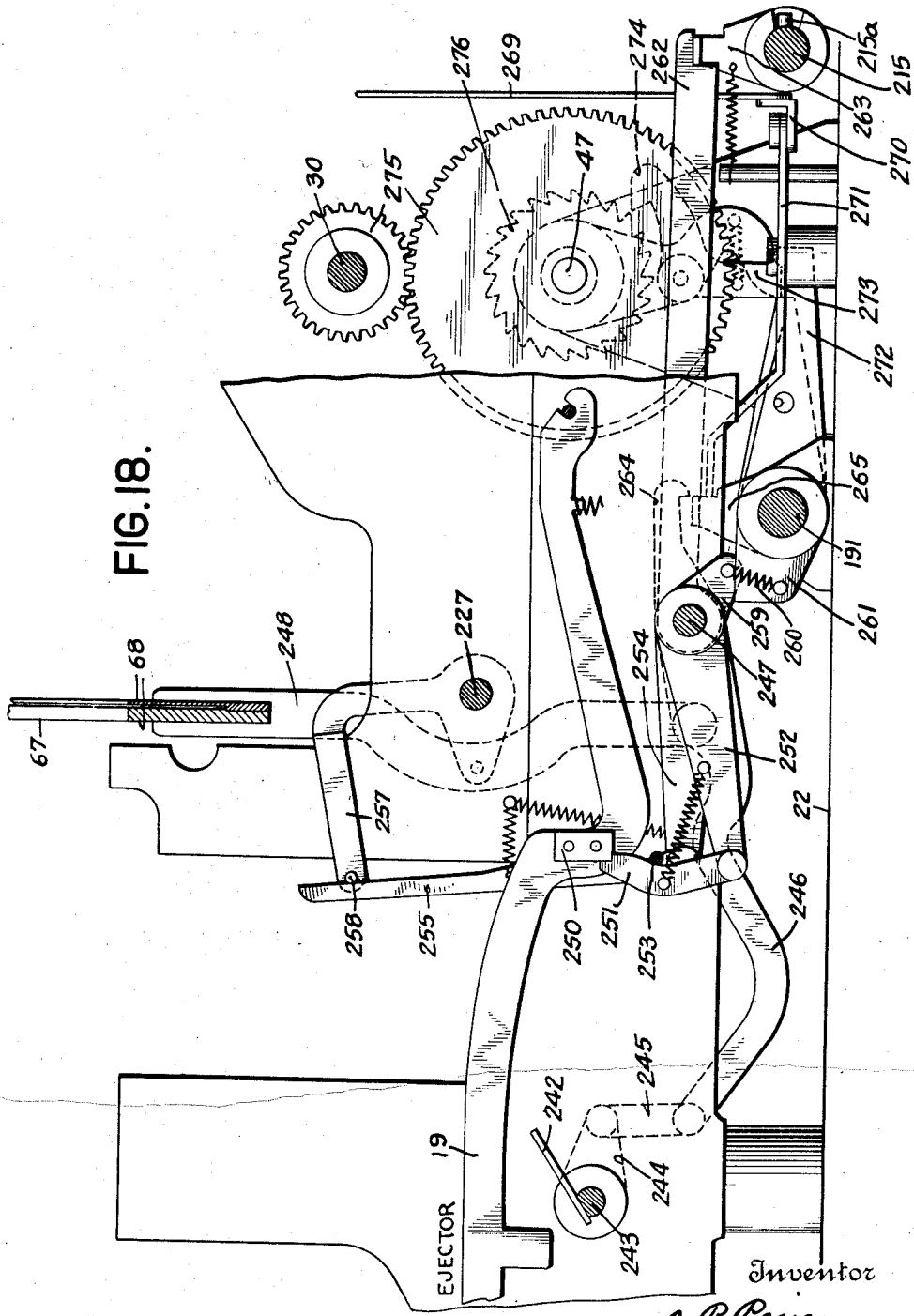

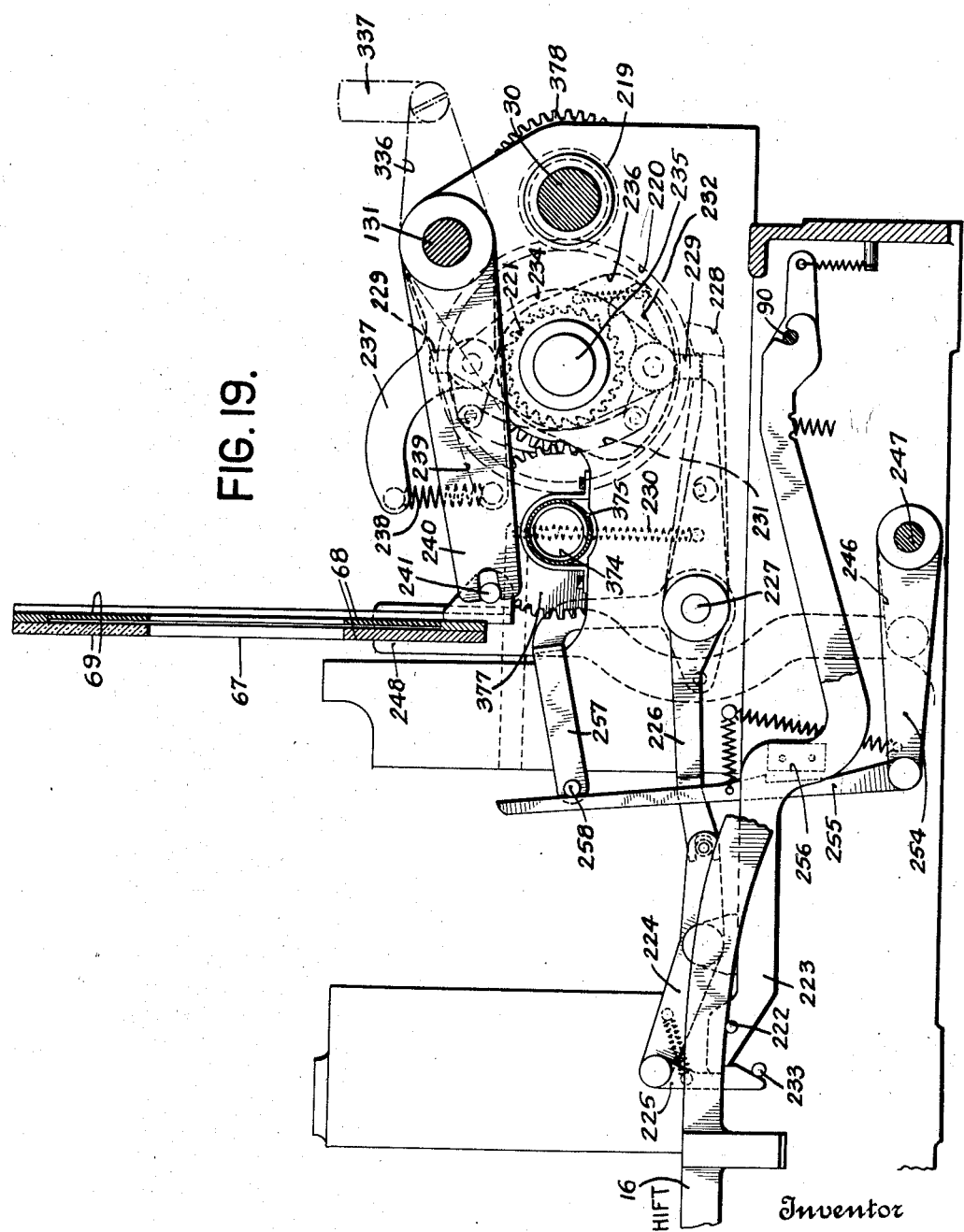

July 12, 1932.　　　J. R. PEIRCE　　　1,867,025
COMBINATIONAL HOLE PUNCH
Filed April 7, 1930　　　23 Sheets-Sheet 15
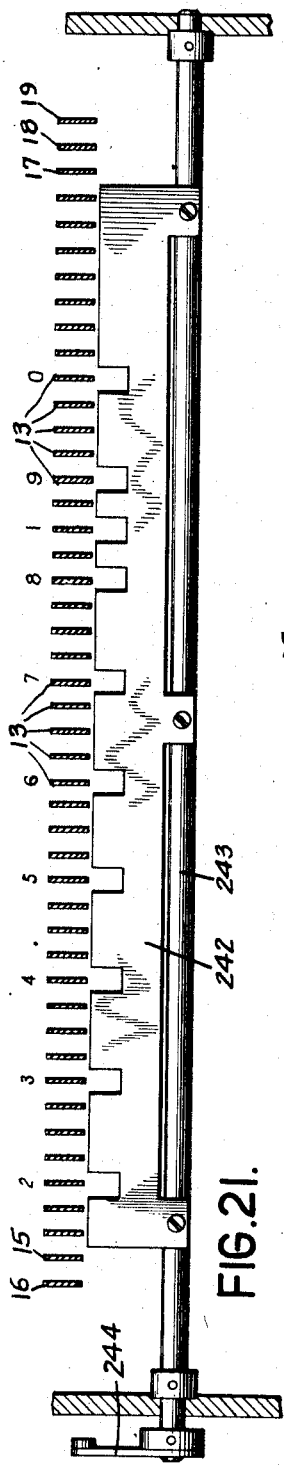
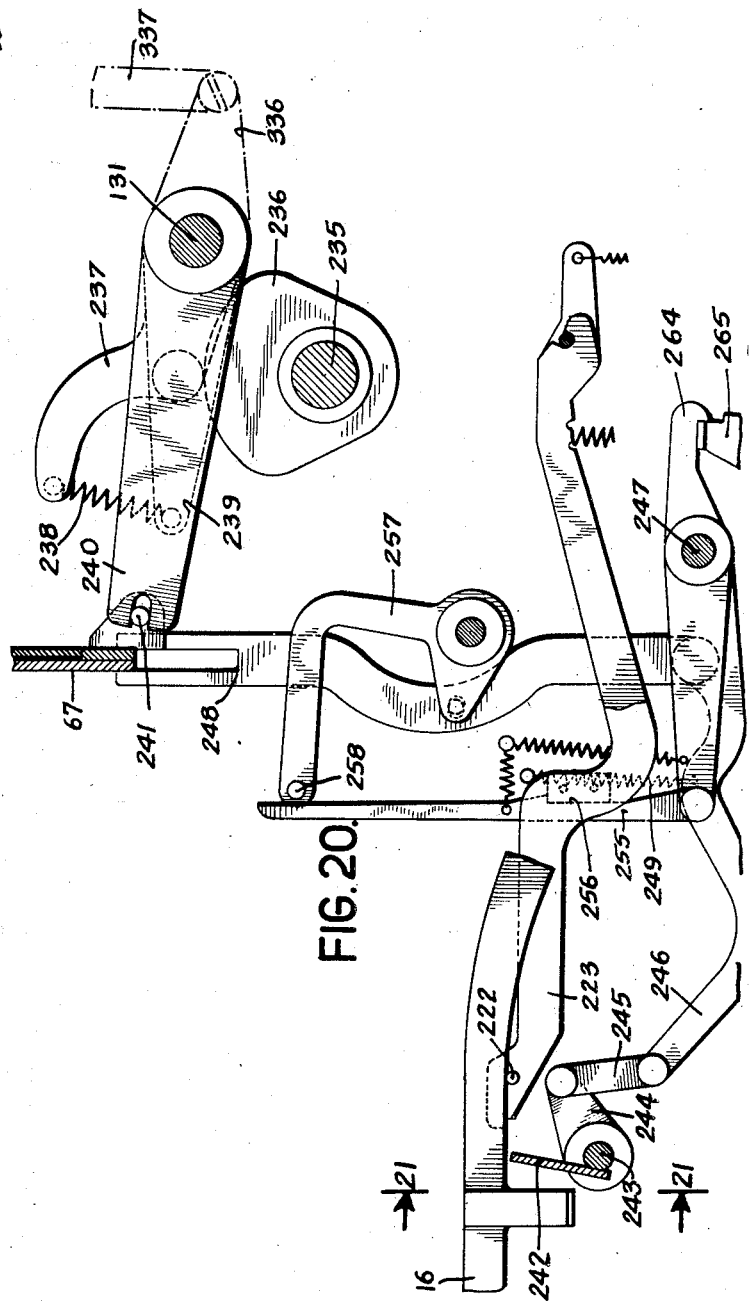

July 12, 1932. J. R. PEIRCE 1,867,025
COMBINATIONAL HOLE PUNCH
Filed April 7, 1930 23 Sheets-Sheet 16

July 12, 1932.  J. R. PEIRCE  1,867,025
COMBINATIONAL HOLE PUNCH
Filed April 7, 1930   23 Sheets-Sheet 18

Inventor
J. R. Peirce
By his Attorney
Wm Wilson

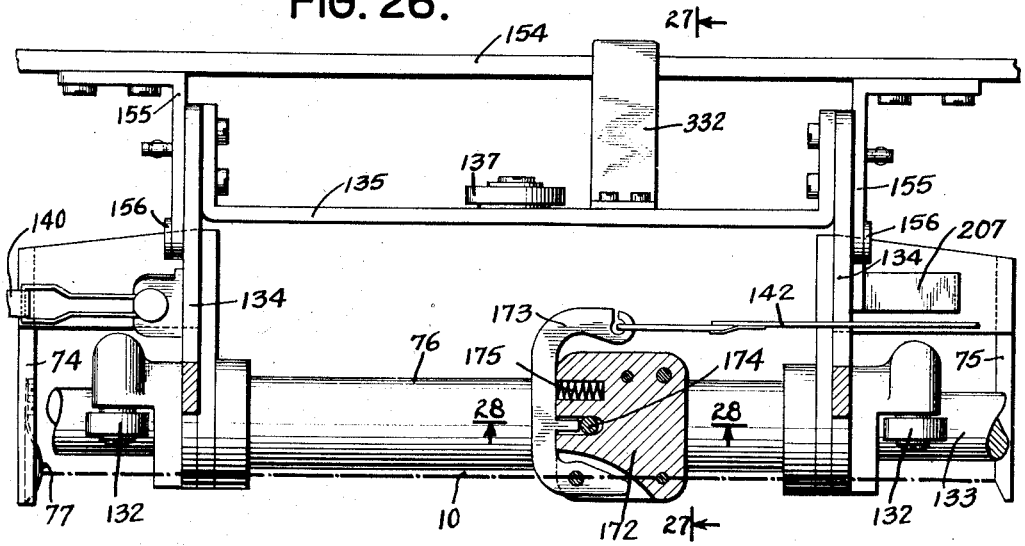
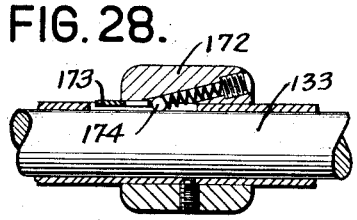
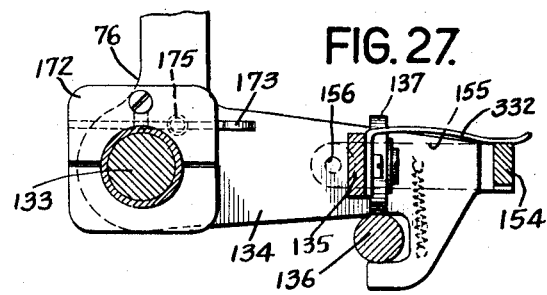
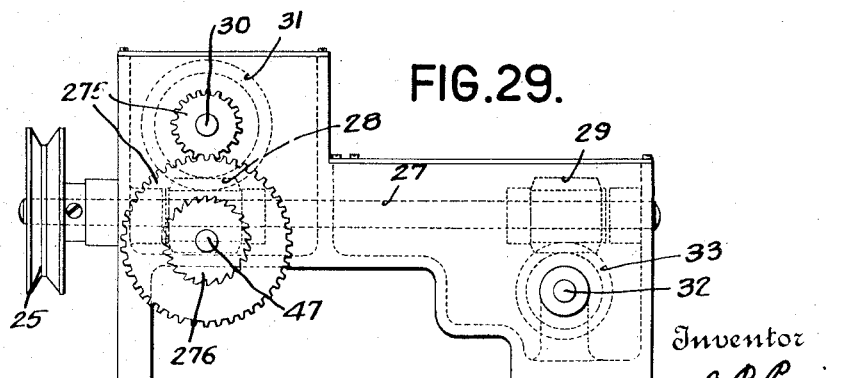

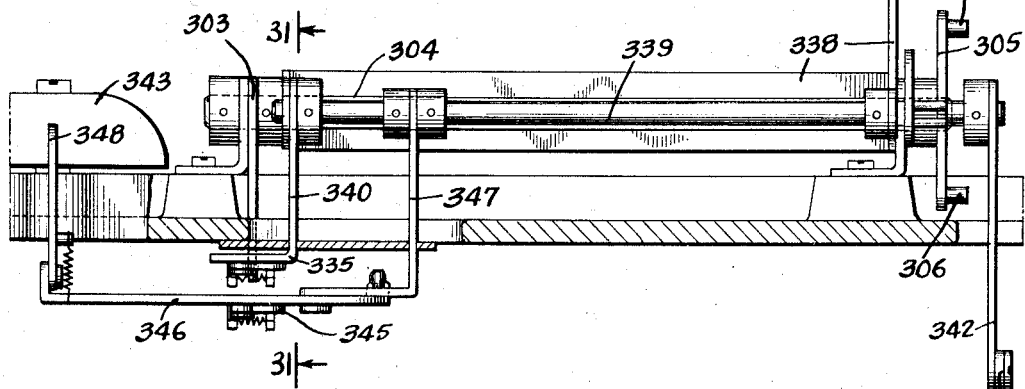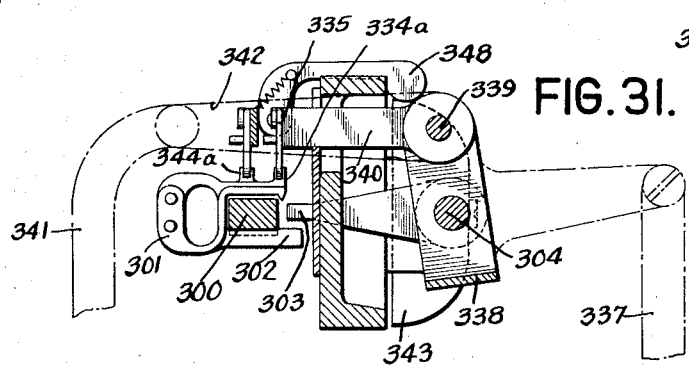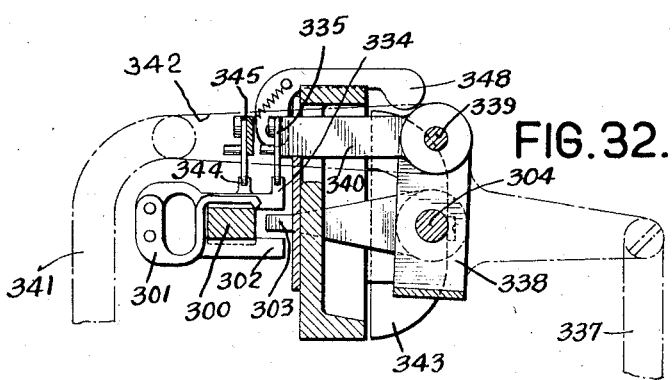

July 12, 1932. J. R. PEIRCE 1,867,025
COMBINATIONAL HOLE PUNCH
Filed April 7, 1930 23 Sheets-Sheet 21

July 12, 1932.    J. R. PEIRCE    1,867,025
COMBINATIONAL HOLE PUNCH
Filed April 7, 1930    23 Sheets-Sheet 22

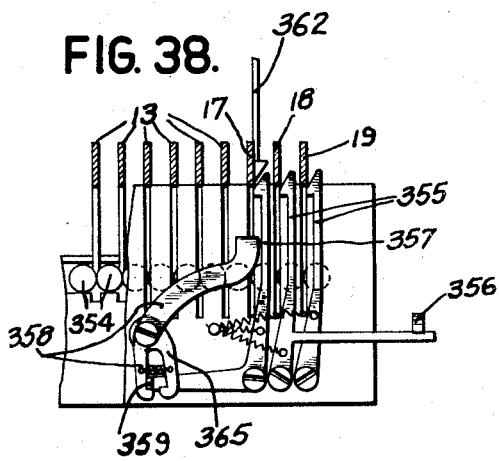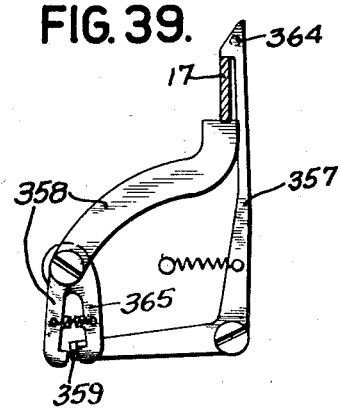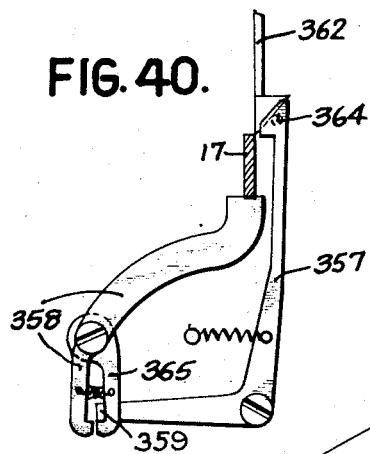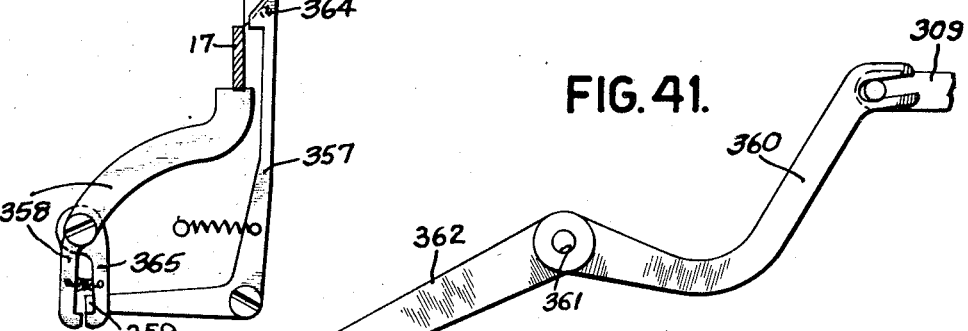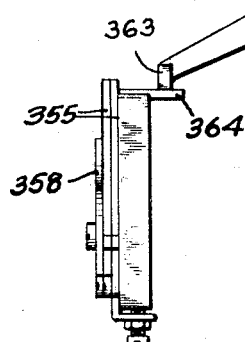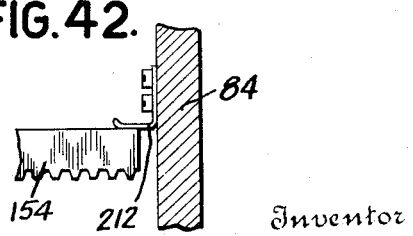

Patented July 12, 1932

1,867,025

UNITED STATES PATENT OFFICE

JOHN ROYDEN PEIRCE, OF NEW YORK, N. Y., ASSIGNOR, BY MESNE ASSIGNMENTS, TO THE TABULATING MACHINE COMPANY, OF NEW YORK, N. Y., A CORPORATION OF NEW JERSEY

COMBINATIONAL HOLE PUNCH

Application filed April 7, 1930. Serial No. 442,347.

This invention relates to card perforating machines and more specifically to a machine applying statistical and other data to record cards adapted for use in the control of automatic tabulating machines in the form of perforations. Statistical cards used in tabulating machines and commonly known as the Peirce card are provided with a plurality of vertical columns of index point positions divided horizontally into upper and lower fields in which holes are perforated in one or more positions in each column of a horizontal field to indicate a value or a symbol. Accompanying such combinations of perforations are typewritten interpretations printed in the same column and preferably on the margin of the card.

The machine provides a single row of punches and the card is fed step by step or column by column past the punches and one or more of the punches are actuated between each feeding step to punch holes in the column. The card is shifted to present either upper or lower field to the punches.

One of the objects of the invention is to provide a machine of this character wherein the items of indicia being punched will be simultaneously printed upon one portion of the card, whereby the card will contain two readable items one of which is tabulatable and the other is utilized for convenient sight reading.

Another object is to provide a simple and efficient structure embodying a plurality of key controlled punches, a feeding mechanism for transferring cards from the hopper into punching position and a discharge mechanism for removing them after being punched.

A further object is to provide a machine in which the weight of touch is in no way altered from that of the ordinary typewriting machine, because of the additional perforating operations performed by depression of the keys.

A still further object is to provide in a printing punch of this character, positive power actuation of the usual card positioning devices such as effect shifting the card to receive data in upper or lower field, back spacing, tabulating, spacing and carriage returning.

Another object is to provide means whereby in the punching of the card step by step, certain groups of columns may be skipped automatically to the next predetermined column for entry.

Another object is to provide means whereby certain operating keys may be locked against operation when the card is in a certain position.

Another object is to provide means whereby a punched card may be ejected, the carriage returned to starting position and a new card fed to punching position by the depression of but a single key.

Another object is to provide novel mechanism for determining the combination of punches to be selected, upon depression of any typewriter key, in accordance with the perforation code employed.

Another object is to provide a structure which permits visibility of the characters as they are typed.

Another object is to provide means to prevent the rebounding of the card carriage upon the sudden arresting of its forward movement.

These and other objects and advantages both as to manner of construction and mode of operation will appear in the following description and claims in which Fig. 1 is a front elevation of the machine showing the relation of the card magazines and the typewriter keyboard.

Fig. 4 is a section taken on line 4—4 of

Figure 2:
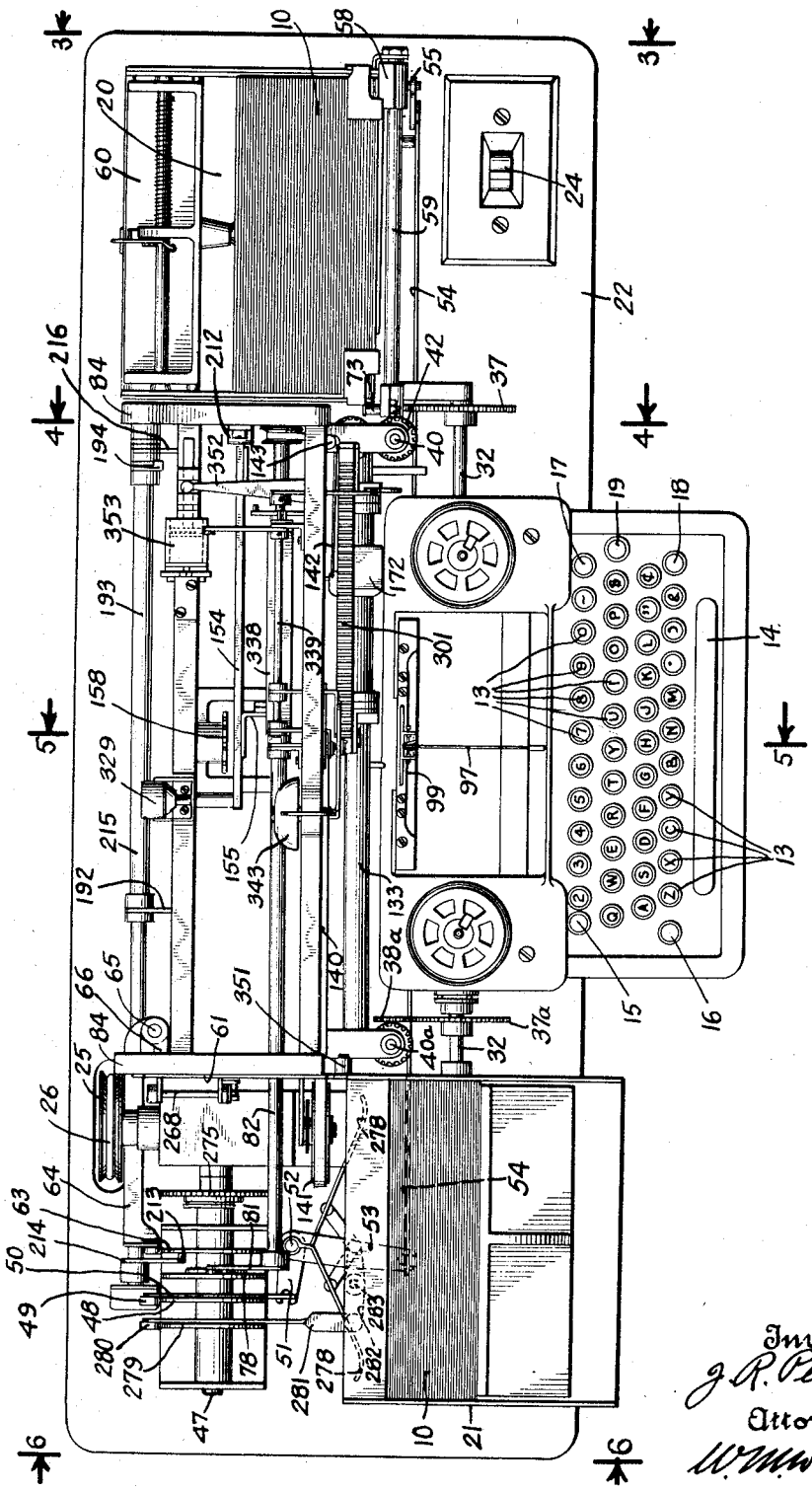
Fig. 2 is a plan view of the machine.

Fig. 2 showing the carriage return mechanism.

Figure 5:
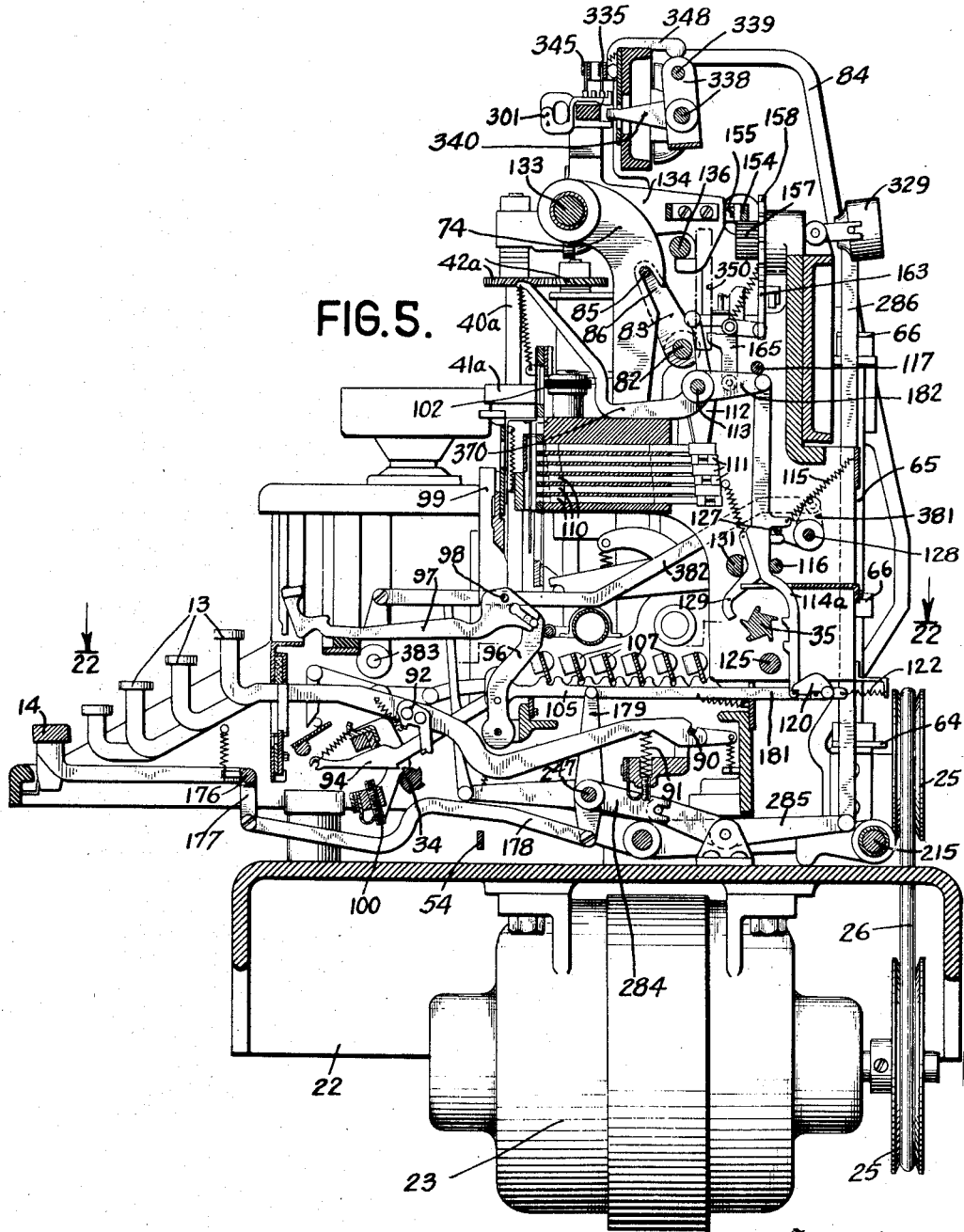

Fig. 5 is a central sectional elevation of the machine taken on line 5—5 of Fig. 2.

Figure 6:
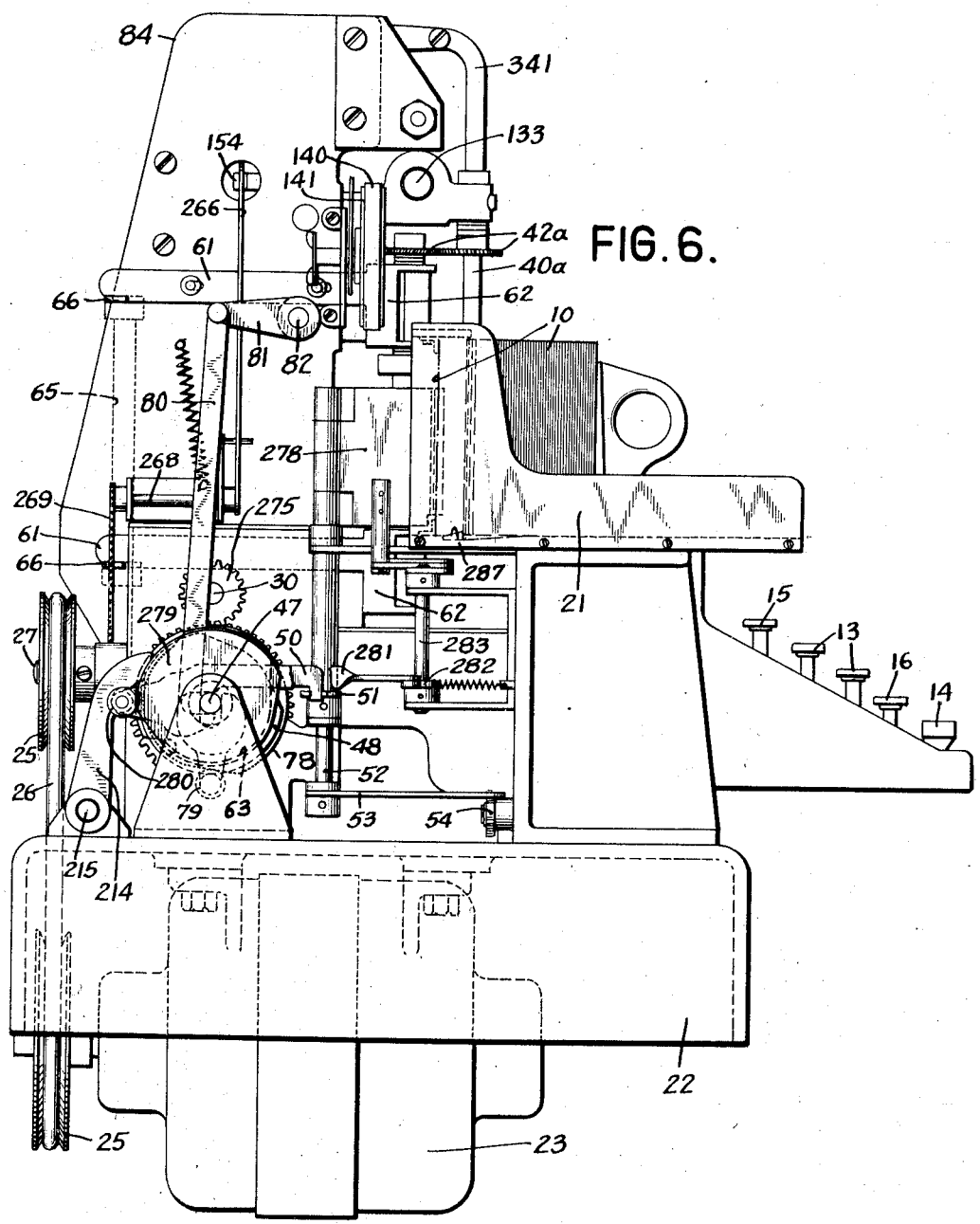

Fig. 6 is a left side elevation indicated by line 6—6 of Fig. 2 and shows the discharge pocket for receiving punched cards.

Fig. 7 is an enlarged detail view of the card frame and card carriage.

Fig. 8 is an enlarged detail view showing the operating connections between a key and its associated type element and punch selecting devices.

Fig. 9 is a position view of parts shown in Fig. 8 in moved position to cause punch actuation.

Fig. 10 is an enlarged detail of carriage escapement mechanism.

Fig. 11 is a sectional detail showing a device to disable the escapement devices when the card is in the last punching position.

Fig. 12 is a detail of the mechanism caused to function when the back-space key is depressed.

Fig. 13 is a plan view of parts shown in Fig. 12.

Fig. 14 is a detail of differential gearing shown in Fig. 13.

Figure 15:
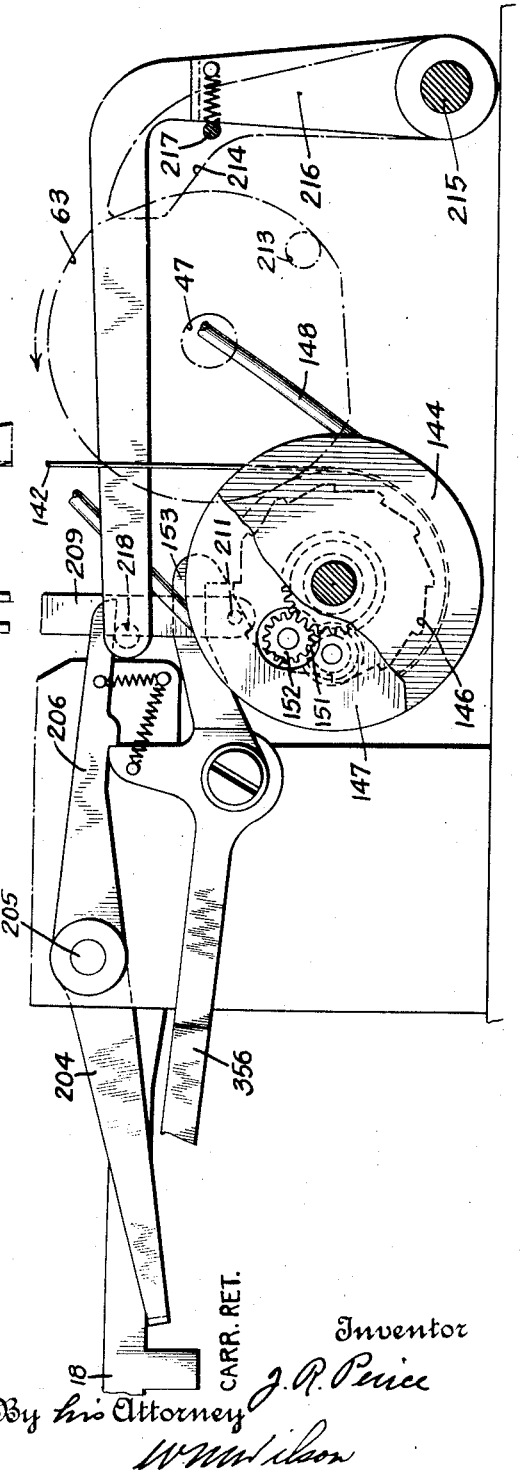

Fig. 15 is a view disclosing carriage return mechanism, controlled manually and automatically.

Figure 16:
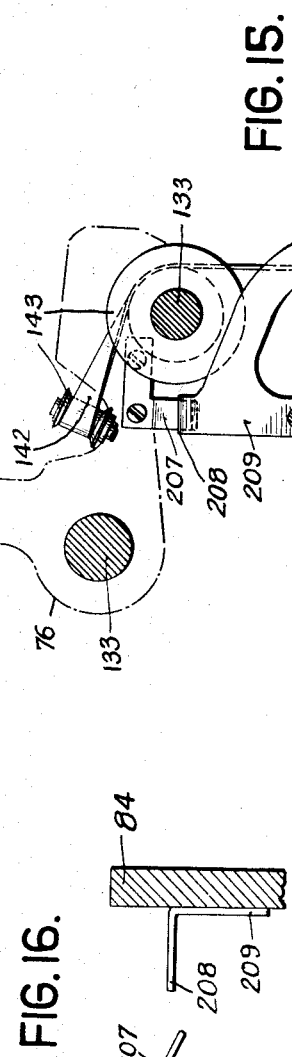

Fig. 16 is a side view of parts of Fig. 15.

Fig. 17 is a view showing the clutch devices and mechanisms brought into action by operation of the tabulating key. Connections are also disclosed which permit automatic operation of these devices.

Fig. 18 is a detail of ejector key initiated mechanism for removing a card from punching position and advancing a new card thereto.

Fig. 19 is a detail of mechanism adapted upon successive operations of the shift key to alternate the position of the card in relation to the punches between upper and lower fields.

Fig. 20 is a position view of parts shown in Fig. 19 showing the card frame in raised position.

Fig. 21 is a detail view of mechanism for suppressing the operation of alphabet keys when the lower field of the card is in position for punching. The view is a section taken on line 21—21 of Fig. 20.

Figure 22:
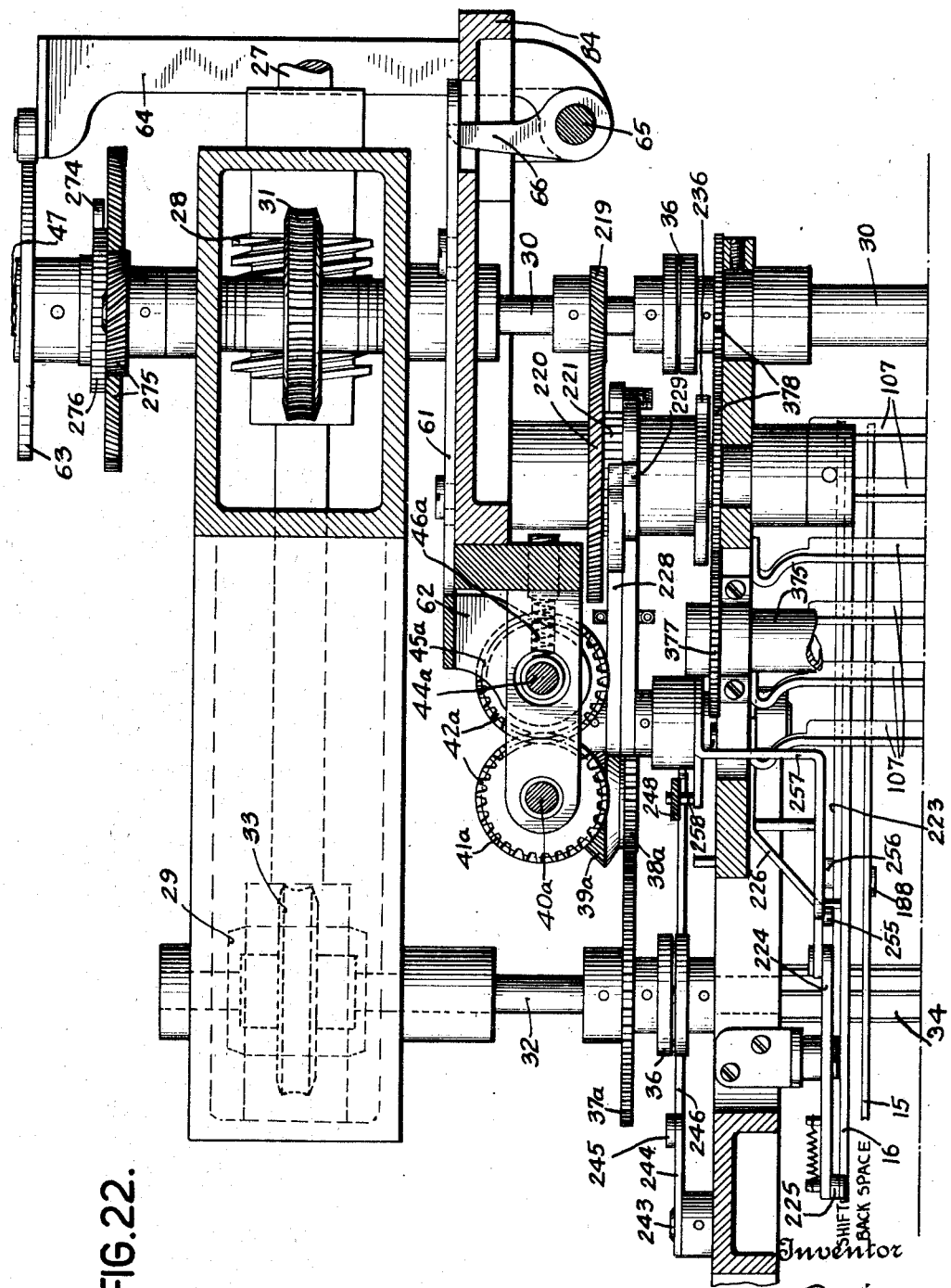
Figure 23:
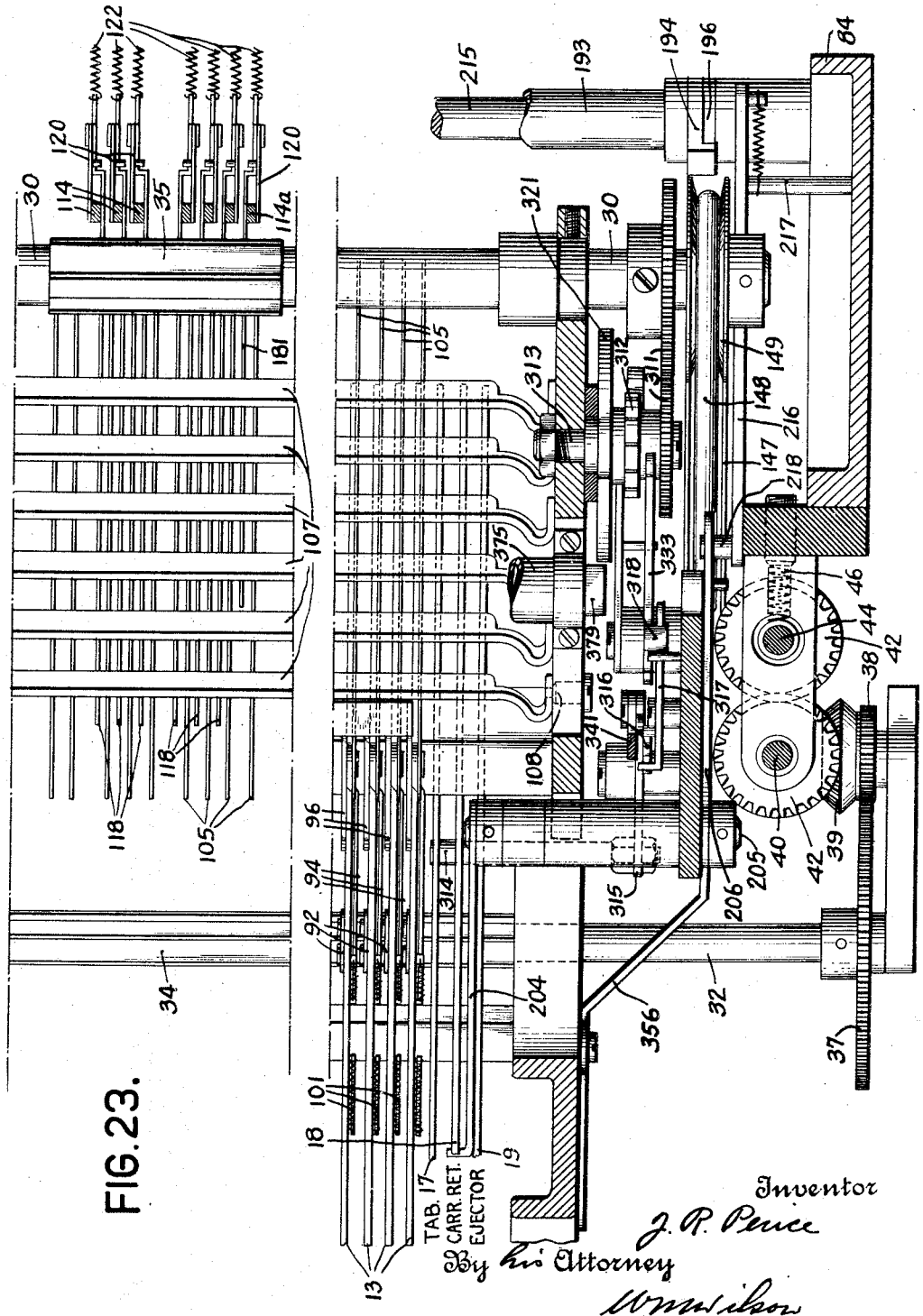

Figs. 22 and 23 taken together are a plan sectional view taken substantially along the line 22—22 of Fig. 5.

Figure 24:
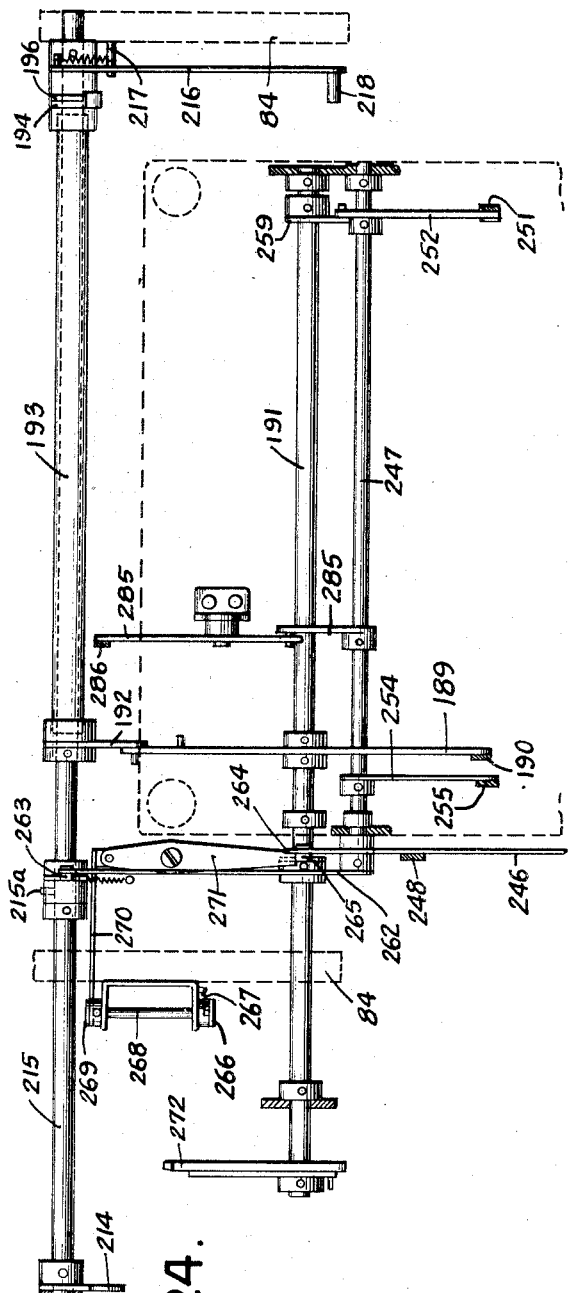

Fig. 24 is a plan detail showing the interconnection of various control elements.

Figure 25:
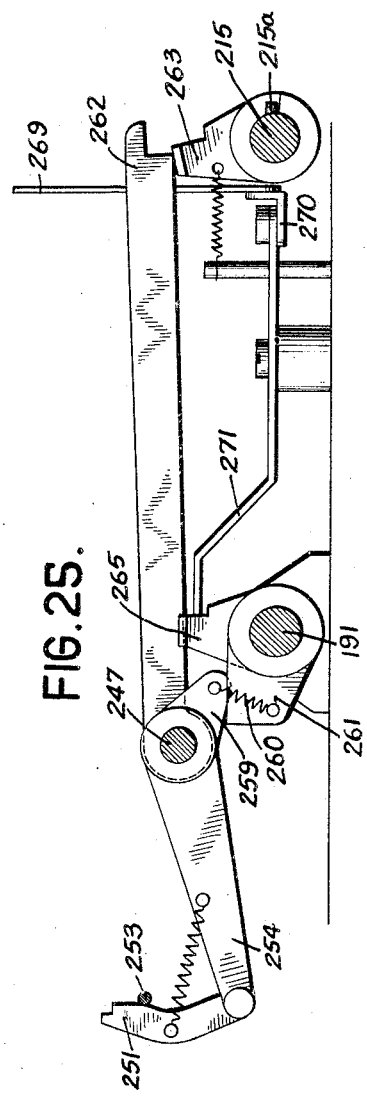

Fig. 25 is a detail of interlocking control devices.

Fig. 26 is a plan detail of the card carriage.

Fig. 27 is a view taken on line 27—27 of Fig. 26.

Fig. 28 is a view taken on line 28—28 of Fig. 26.

Fig. 29 is a view showing certain continually running gearing of the machine.

Fig. 30 is a plan detail of certain automatic operation controlling devices.

Fig. 31 is a section taken on line 31—31 of Fig. 30.

Fig. 32 is a view of parts shown in Fig. 31 in another position.

Figure 33:
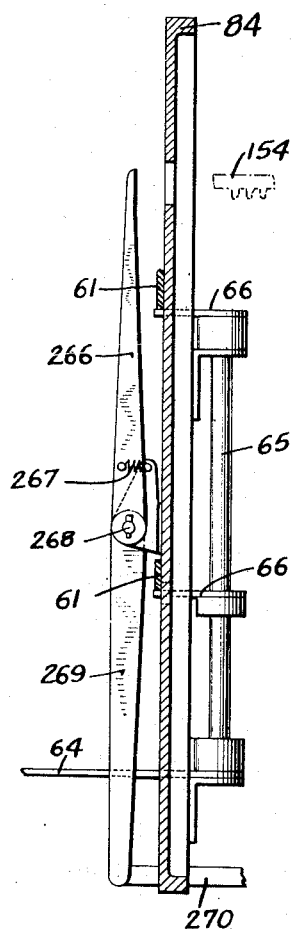

Fig. 33 is a detail of mechanism controlled by the card carriage when in its last punching position.

Figure 34:
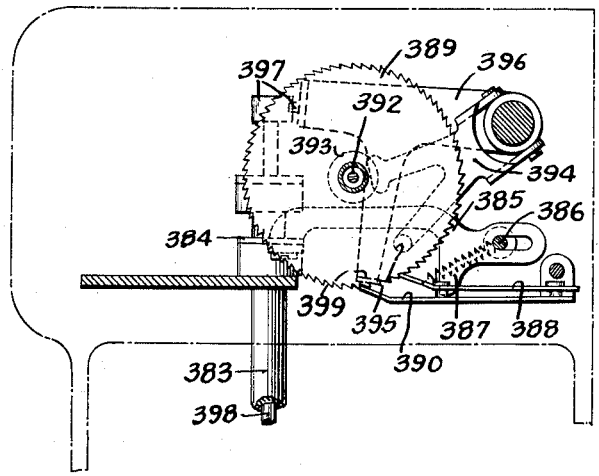

Fig. 34 is a detail of ribbon feeding mechanism.

Figure 35:
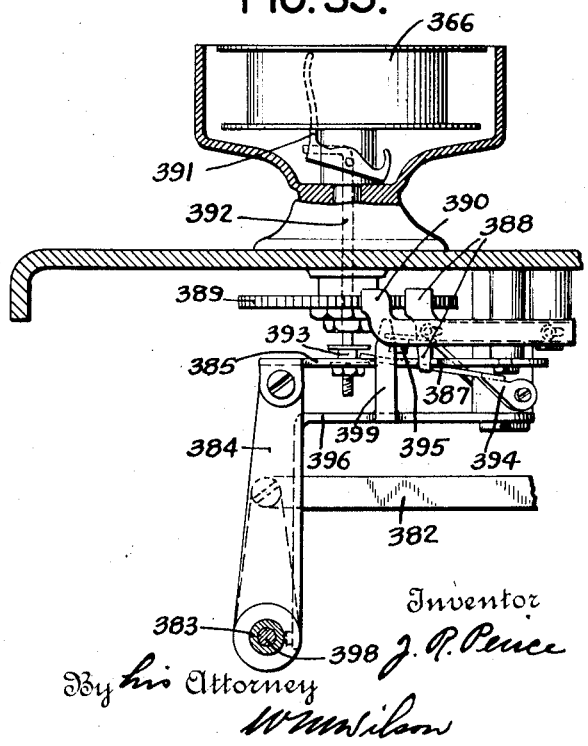

Fig. 35 is a further detail of ribbon feeding mechanism.

Figure 36:
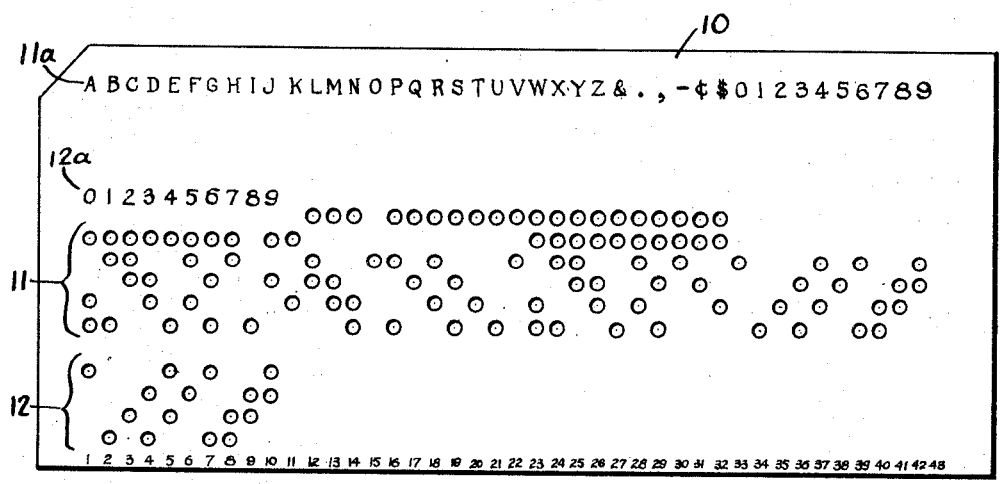

Fig. 36 is a view of the card and code perforations.

Figure 37:
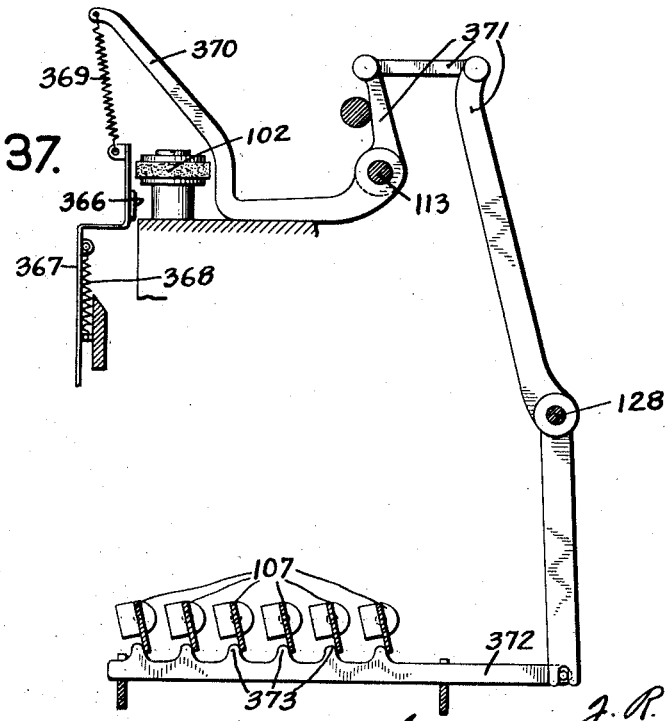

Fig. 37 is a detail of ribbon positioning mechanism.

Fig. 38 is a detail of a key interlocking device.

Fig. 39 is a position view of a particular key locking device.

Fig. 40 is a further position of parts in Fig. 39.

Fig. 41 is a side view of Fig. 38.

Fig. 42 is a detail of a spring device for lowering the escapement rack.

The card 10 prepared by the machine is shown in Fig. 36 as having an upper field of punching 11 and a corresponding upper line of printing 11a. The field 11 provides for six index point positions in each column and is adapted to receive both alphabetical and numerical perforations as illustrated. An imaginary line divides this field from a lower punching field 12 having but four index point positions and adapted to receive numeral perforations only. This field has an associated printing line 12a adapted to receive impressions, as is also the case in connection with the upper field, simultaneous with the piercing of the card by the punches.

The machine is provided as shown in Figs. 1, 2, 3 and 6 with a full typewriter keyboard containing the usual alphabetical, numeral and symbol keys 13, a space bar 14, back space key 15, shift key 16 and tabular key 17. Additional keys 18 and 19 are provided to effect carriage return and card eject operations respectively. The depression of any key 13 results in punching the combination of the character in the column presented to punching position and in typewriting the character in the field 11a or 12a as the case may be, above the punched combination. The functions of the various other keys will be more particularly pointed out hereinafter.

The cards to be prepared are placed in a supply hopper 20 from which they are fed, singly, to a carriage having suitable escape mechanism to cause step by step advancement of the card past the punching station which comprises a single column of six punches, only four of which are active when the lower field of the card is presented for entry.

From the card carriage the prepared card is ejected into a discharge hopper 21 in which the cards are arranged in the same order as they entered.

Machine drive

Hung beneath the base 22 of the machine is a motor 23 adapted upon closure of a switch 24 to operate continuously, (see Figs. 1, 2, 6, 22, 23 and 29). Through pulleys 25 and belt 26, the motor drives a worm shaft 27 which has mounted thereon worms 28 and 29. Worm 28 drives shaft 30 through worm gear 31 and worm 29 drives shaft 32 through a similar worm gear 33. In Figs. 22 and 23, shaft 32 has a fluted portion 34, adapted, as will be explained, to cause actuation of the type hammers when coupled thereto by the keys 13.

Shaft 30 has a similarly fluted section 35 for supplying energy to actuate the punches. Both these shafts through the gearing just traced are continually running and operate in unison. Couplings 36 are interposed for assembling purposes.

Card feeding

Referring now to Figs. 1, 3, 4 and 23, continually running shaft 32 has secured to one end thereof a gear 37 meshing with a gear 38 which through miter gears 39 keeps a vertical shaft 40 in constant rotation. Shaft 40 carries friction rollers 41 and through helical gears 42 drives shafts 43 and 44 which carry rollers 45. Springs 46, as in Fig. 23 urge rollers 45 into close frictional engagement with rollers 41 permitted by enlarged bearing supports, as shown.

Figure 1:
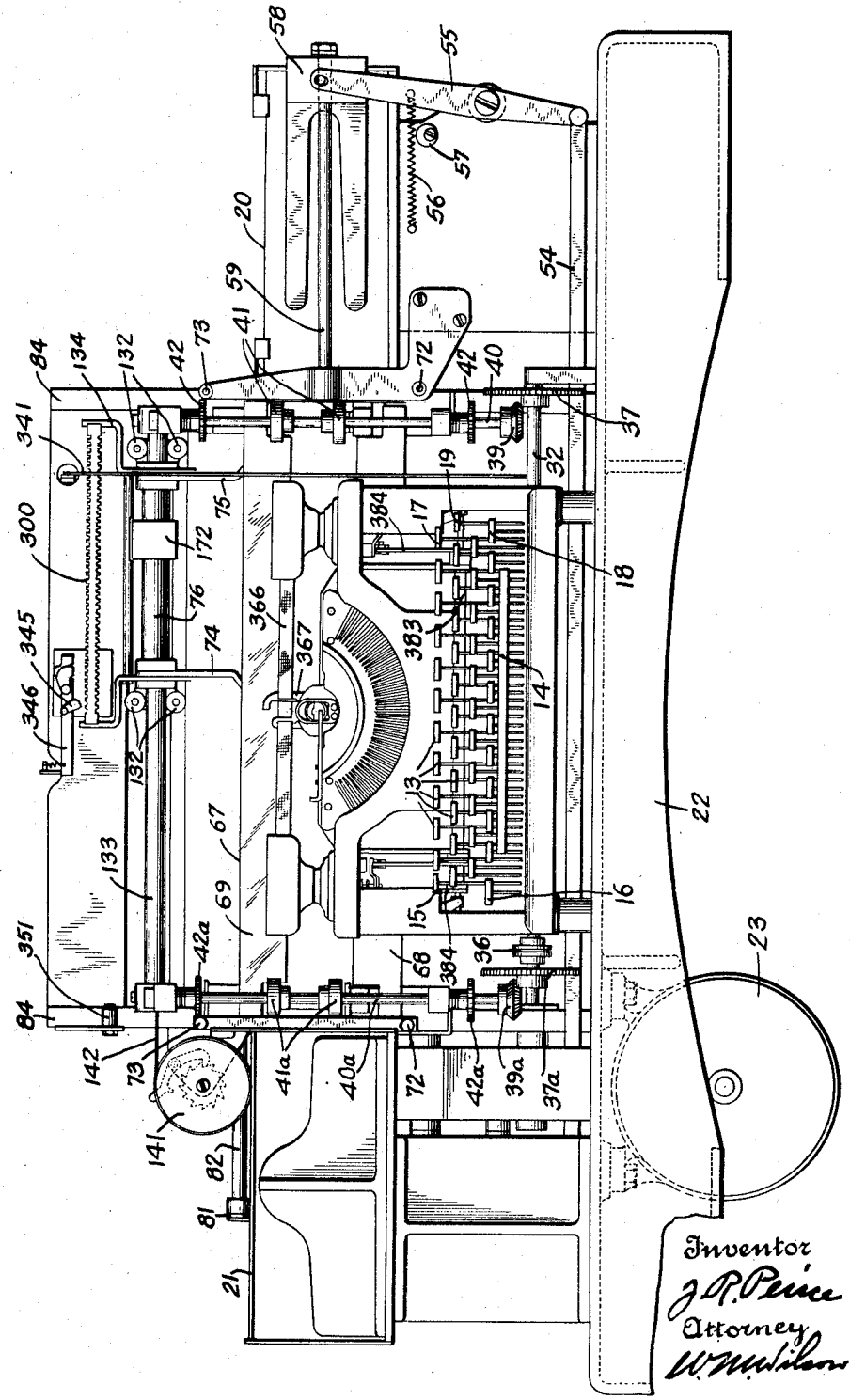
Figure 3:
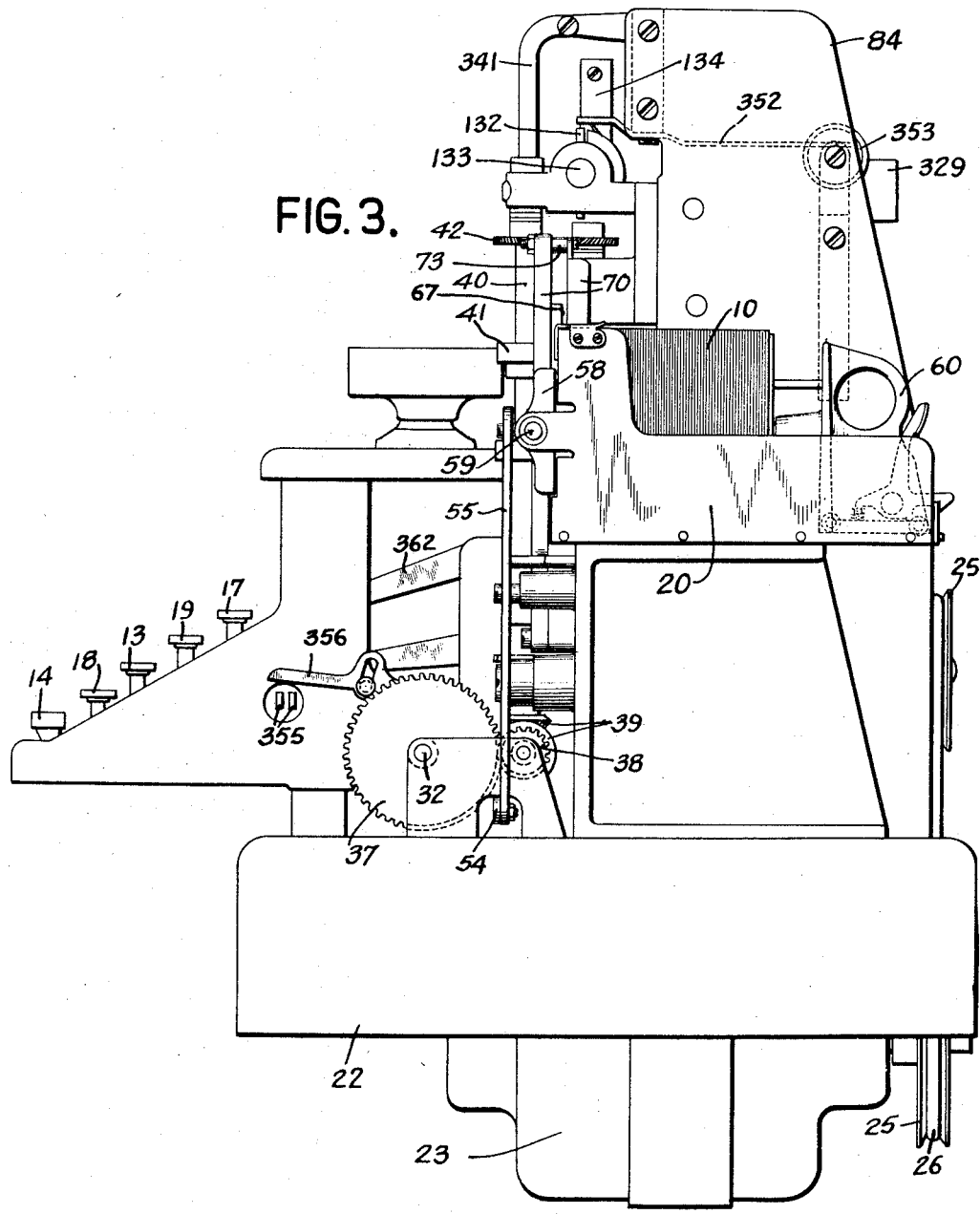
Fig. 3 is a right side elevation looking at the new card hopper as indicated by line 3—3 of Fig. 2.

With no card in punching position it is necessary to send the machine through an eject operation in order to introduce a new card. After a card has been prepared and it is desired to bring a new one into position, this same eject operation is entered into. The manner of initiation of this eject cycle will be described later, suffice it to say at present that a shaft 47 in Figs. 2 and 6 is permitted to turn through one revolution during which time a cam 48 mounted thereon cooperates with a roller 49 carried by a sliding plate 50. A projection on the end of this plate engages in a slot of an arm 51 pinned to a vertical rod 52 the lower extremity of which carries an arm 53. A link 54 mounted for reciprocation has an upward extending projection at one end which cooperates with the slotted end of arm 53. The other end of this link as seen in Figs. 1 and 3 has connection with a pivoted lever 55, rocked in a counterclockwise direction by spring 56 against an adjustable eccentric stop 57 to slide a picker device 58 upon rod 59. The picker 58 is adapted, as is usual, to rock slightly upon rod 59, the better to engage the edge of the card it is desired to feed. The usual spring urged backing plate 60 is provided to urge the cards forwardly against the picker.

Toward the completion of the revolution of shaft 47, cam 48 permits spring 56 to actuate the picker 58 to feed a card toward the continually running rollers 41, 45 which engage its leading edge and advance it rapidly into the card frame and carriage by which it is advanced for punching until eventually it occupies a position with its last column in alinement with the punches.

In such position the leading edge is between continually running rollers 41a and 45a mounted upon shafts 43a, 44a, and 40a respectively and driven in a familiar manner through chain of gearing consisting of helical gears 42a, miter gears 39a, gear 38a to gear 37a mounted on continually running shaft 32.

Shafts 43a and 44a (Figs. 2, 6, 7 and 22) are mounted in suitable bearings having sufficient clearance to permit withdrawal of rollers 45a from engagement with cooperating rollers 41a against the action of springs 46a. Arms 61, having pin and slot mounting to permit reciprocation, carry shafts 43a and 44a in yoke-like extensions 62 adapted when drawn to the right in Fig. 22 to hold rollers 41a and 45a out of engagement without demeshing gears 42a so that when the card has been advanced to its last punching position and its leading edge is between the rollers, movement of arms 61 to the left will permit the rollers to engage the card and feed it into hopper 21. This movement to the left occurs in the aforementioned eject cycle wherein a cam 63 mounted on eject shaft 47 permits a lever 64 to turn a shaft 65 in a counterclockwise direction in Fig. 22. Shaft 65 (see also Fig. 5) has a pair of fingers 66 engaging notches in the arms 61 to release arms 61 at the proper time in the cycle to remove the card to the hopper. The outline of cam 63 is more clearly defined in Fig. 15.

Card frame

The card 10 is fed by the picker knife 58 and rollers 41 into a frame 67, Figs. 1, 3, 4, 7 and 8, adapted to receive the card and guide it across the machine. The lower edge of the card enters a slot formed by plates 68 and the upper edge enters a slot formed by plates 69, the forward one of which is of transparent material such as celluloid and has an opening therein to permit printing on the upper margin of the card as seen in Fig. 7.

The frame is guided for vertical movement and restrained against lateral displacement by engagement with the inner sides of hoppers 20 and 21. Movement to the front or rear is prevented by guides 70 on one end as in Fig. 3 and similar devices on the other. The frame may occupy either of two positions, a lower or normal position to receive data in upper fields 11 and 11a or an upper position in which entries are made in fields 12 and 12a of card 10. Springs 71 hold frame 67 in lower position against adjustable eccentric stops 72 and when the frame is raised to its upper position by mechanism to be described later its upper edge rests against eccentric stops 73.

A new card may be introduced only when the frame 67 is in its lower position, wherein the tracks formed by plates 68 and 69 lie in the path of travel of card 10. A pair of fingers 74 and 75 pivoted on and depending from a card carriage escapement device 76 yet to be described have their free ends adapted to be moved in and out of the path of the card 10. By referring to Figs. 4 and 26 it will be noted that the free end of finger 74 is longer than that of finger 75, and the time of operation of the parts is such that as the rollers 41, 45 advance the new card 10 along the tracks of frame 67, the fingers 74, 75 are moved to such position that the end of finger 75 is just out of the line of travel to permit the leading edge of the card to pass by. The end of finger 74, however, being longer, engages the leading edge of card 10 interrupting the forward inertia imparted by the feed rollers. The end of finger 75 thereupon moves ahead to engage the rear edge of the card, holding it thusly with the first column in printing and punching position. A spring 77 may be provided to aid in securely gripping card 10 between fingers 74, 75.

The card held in this manner is moved along step by step under control of the carriage escapement mechanism which will later be explained. In Fig. 6 a cam 78 on shaft 47 cooperates with a roller 79 on a link 80 to draw the latter downward and through an arm 81 rock a shaft 82 counter-clockwise. On this shaft 82 are secured a pair of arms 83 (see Figs. 4 and 5) one against each supporting frame 84 of the machine and having extended between them a rod 85 which cooperates with notches 86 in fingers 74 and 75. This structure permits lateral movement of fingers 74 and 75 to position the card 10 and allows rocking of said fingers into or out of engagement with the leading and trailing edges of the card.

*Typewriter action*

Each typewriter key lever 13 is pivoted at 90 (see Figs. 5 and 8) and held in normal elevated position by a spring 91. A spring pressed dog 92 pivoted on key lever 13 engages a lateral projection 93 of a hook 94, pivoted on a pin 95 in arm 96 the free end of which has the usual pin and slot connection with a type carrier 97 pivoted at 98 on the type carrier basket 99.

Depression of key 13 through dog 92, rocks hook 94 into engagement with one of the ratchet shaped ribs of continually running shaft 34. With shaft 34 turning in the direction indicated by the arrow, hook 94 is drawn to the left, rocking its connected arm 96 to impel carrier 97 rapidly against the card 10 to make an imprint thereon. Toward the end of the leftward movement of hook 94 it engages a stop 100 which cams the hook out of engagement with shaft 34 and thereafter spring 101 returns the parts to normal position. If key 13 is held depressed, projection 93 returns against the left side of dog 92 rocking the dog and thus preventing repeat operations due to such continued key depression.

The platen 102 with which the type carriers cooperate is circular and has a ball bearing mounting. The frictional contact of the platen with the card as it moves along turns the former so as to present a constantly changing point of impact to the carriers to obtain uniform platen wear.

A closely wound spring 103 is coiled about a flattened rod 104 extending across the typewriter frame and is adapted to absorb the shock and noise incident to the restoration of arm 96 by acting as a cushion therefor.

*Selection of the punches*

Coincident with the rocking of arm 96 under influence of positive actuator 34 a slide 105 which has slot connection with pin 95 in arm 96 is drawn to the left in Fig. 8. Slide 105 has upwardly extending projections 106 abutting bails 107 pivoted at 108. These bails are six in number corresponding with the six index point positions of the code as shown in Fig. 36 and extend across the typewriter section of the machine as shown in Figs. 22 and 23.

Depression of any key 13 will rock one or more bails 107 in accordance with the number and position of index points allotted to that particular character. For instance in the example of Fig. 8, the key 13 corresponding to "7" is shown. Its slide 105 is adapted to rock the first and second bails 107 counting from the right. These correspond in Fig. 36 to the first and second perforations from the lowermost index point of field 11 in the column headed "7". If the "S" key were depressed, by the same manner of conversion in accordance with the code, the bails 107 rocked, would be the first, third and sixth from the right. Each of the bails 107 has operating connection to the punch associated with the corresponding index point position.

Referring to Figs. 5, 7, 8, 9, 10 and 23, the punches 110 have their rear ends terminating in slotted blocks 111 in each of which is a lateral extension of a bell crank 112 loosely pivoted on rod 113. Depending from the end of the other arm of bell crank 112 is a punch actuating link 114 held by a spring 115 against rods 116 and 117. A series of slides 118 are provided with double projections to grip bails 107 and have a spring pressed dog 120 cooperating with a pin 121 in the lower end of link 114. A spring 122 tends to hold slide 118 and its bail 107 to the right. Thus, when any bail is rocked clockwise in Fig. 8 it will move its associated slide to the left and through dog 120 and pin 121 rock link 114 so that a tooth 123 thereon will be moved into engagement with a rib of continually running shaft 35 which when thus engaged moves the parts as shown in Fig. 9 drawing downward on link 114 to rock bell crank 112 and force punch 110 through card 10. Downward movement of link 114 brings camming projection 124 into cooperation with a rod 125 to force tooth 123 out of engagement with shaft 35. Extension 126 on link 114 rocks a bail 127 secured to a rod 128 counterclockwise. To one side of link 114 is a punch restoring member 129 connected at its upper end to an arm 130 on shaft 113 and held against a shaft 131 by a spring 132. A projection 133 is adapted to be moved down by bail 127 whenever a punch is actuated. This causes the free end of member 129 to cam itself against the concentric portion of shaft 131 and move downwardly in an oblique direction as in Fig. 9 bringing its extremity in the path of a rib of shaft 35 so that after link 114 has been drawn down, the member 129 will be urged upward against bail 127 which in turn will raise up such links 114 as were previously depressed. In this manner the punches 110 are rapidly and positively actuated in both directions. Since the restoration of slide 118 by spring 122 is necessarily slower in action the latch construction comprising dog 120 and pin 121 is provided to obviate the possibility of repeated punching.

*Card carriage and escapement*

We have seen thus far how cards are introduced into the machine and advanced to initial punching position together with the manner in which entries are made thereon in printed and perforated form. The construction of the card carriage which carries the card gripping fingers will now be disclosed together with the manner in which the carriage is advanced step by step across the machine.

The carriage 76 (Figs. 7 and 26) comprises a tubular structure having rollers 132 attached at the ends for cooperation with a rail 133 upon which the carriage is adapted to move back and forth. A pair of L-shaped side members 134 are connected by a brace 135 for rigidity. A guide rod 136 (see also Fig. 27) cooperates with the hooked ends of members 134 and a roller 137 on brace 135 to further support the carriage structure.

In Figs. 1, 2, 6, 7 and 26 the carriage 76 is shown as being connected at its left end by a tape 140 to the spring wound drum 141. When the carriage is moved from the left hand side of the machine to the right hand side the tape 140 rotates the drum 141 winding the spring contained therein thus storing energy which moves the carriage step by step to the left when the latter is released by the escapement mechanism.

The right hand end of the carriage has a clutch device to which is connected a tape 142 which passes around guide pulleys 143 (Figs. 4 and 15) and is attached to a drum 144. The latter drum is connected to the power drive mechanism for restoring the carriage to its right hand position against the action of the spring in the left hand drum 141.

Referring to Figs. 4, 13, 14 and 15 the drum 144 carries a gear 145 which forms one part of a differential device, the other part of which is a ratchet wheel 146, the driving element being a pulley 147 connected by a belt 148 to a pulley 149 secured to continually running shaft 30 (see also Fig. 23). The interconnecting elements are a gear 150 fast to pulley 147 and the intermeshing pinions 151, 152 carried by pulley 147 and meshing with gears 150 and 145 rigidly connected to ratchet 146 and drum 144 respectively.

Normally as the gear 150 rotates the ratchet 146 which is free also rotates while the drum being connected to the carriage and acting against the spring in drum 141 remains stationary. When the pawl 153 (Fig. 15) is moved into cooperation with the ratchet 146 locking the latter against rotation the drum 144 will then, of course, be caused to rotate winding in the tape 142 and moving the punch carriage 76 toward the right. The actuation of the pawl 153 will be described later.

A toothed rack 154 reaches along the upper portion of the carriage 76 (see Figs. 2, 5, 10, 26 and 27) being attached thereto by brackets 155 pivoted on the carriage at 156. The rack is thus adapted to rock into or out of cooperation with a ratchet pinion 157. Pinion 157 is associated with escapement ratchet 158 being constrained to rotate in one direction therewith by spring pressed pawls 159 but being permitted to rotate in the opposite direction independently of ratchet 158. Ratchet 158 is in turn controlled by escapement pawls 160, 161 carried by member 163 mounted for oscillation about a horizontal axis in the frame at 164. In Fig. 11 the link 129 as we have seen is depressed whenever a punch is actuated. This rocks its arm 130 about rod 113 to draw downwardly upon a member 165 pivoted on arm 130 and having pin and slot connection at 166 with an arm 167 integral with member 163. A spring 168 is adapted to hold member 165 in cooperation with arm 167 so that when link 129 is depressed the member 163 will be rocked about its axis and against the tension of a spring 169 until the pawl 161 disengages the ratchet 158 whereupon the pawl will be rocked counterclockwise by its spring 170. The fixed pawl 160 will continue to prevent appreciable rotation of ratchet 158. When the member 163 is oscillated back to its normal position the movable pawl 161 then comes into position to be engaged by the next lower tooth of the ratchet wheel 158 while the fixed pawl rides out of engagement releasing the ratchet and permitting it to rock counterclockwise as viewed in Fig. 10. The ratchet then engages the movable pawl 161 rocking it against the action of its spring until it strikes a stop 171. This permits the carriage to move one step to the left under the action of the left hand drum 141.

The carriage is provided with a rebound device to prevent reverse movement when the carriage is brought to a sudden stop. This means comprises a block 172 secured to the carriage and having pivoted thereto a member 173 to which the aforementioned tape 142 is attached (see Figs. 26, 27 and 28). A spring pressed ball 174 is contained in block 172 in such manner that it forms a wedge between rail 133 and the sloping wall of the guideway in block 172. A spring 175 normally holds member 173 out of cooperation with ball 174 so that attempted movement of carriage 76 to the right as viewed in Fig. 28 serves to wedge the parts and deflect movement in that direction. When, however, the carriage is to be returned under action of tape 142, the member 172 is rocked under action of tape 142, the member 173 is rocked about its pivot and moves ball 174 upward along its guideway, out of cooperation with rail 133 to permit the free and uninterrupted return of the carriage.

Space bar mechanism

When it is desired to space the card, space bar 14 (as in ordinary typewriter practice) (see Figs. 1, 2 and 5) is rocked downwardly about its pivot 176 and through arm 177 moves a link 178 to the right, as viewed in Fig. 5, to rock a lever 179, loosely pivoted on a shaft 247. The upper end of lever 179 has pivoted thereto a slide 181 to the rear of which is pivoted a spring pressed dog 120 in the manner described in connection with slides 105. This dog cooperates with a link 114a (see also Fig. 10) connected at its upper end to an arm 182 loose on shaft 113. This link 114a has no connection to any of the punches 110, but in a manner similar to the action of the links 114, causes actuation of member 165 to cause the above described escape mechanism to permit the carriage to advance one step.

Back spacing of the carriage

Figure 4:
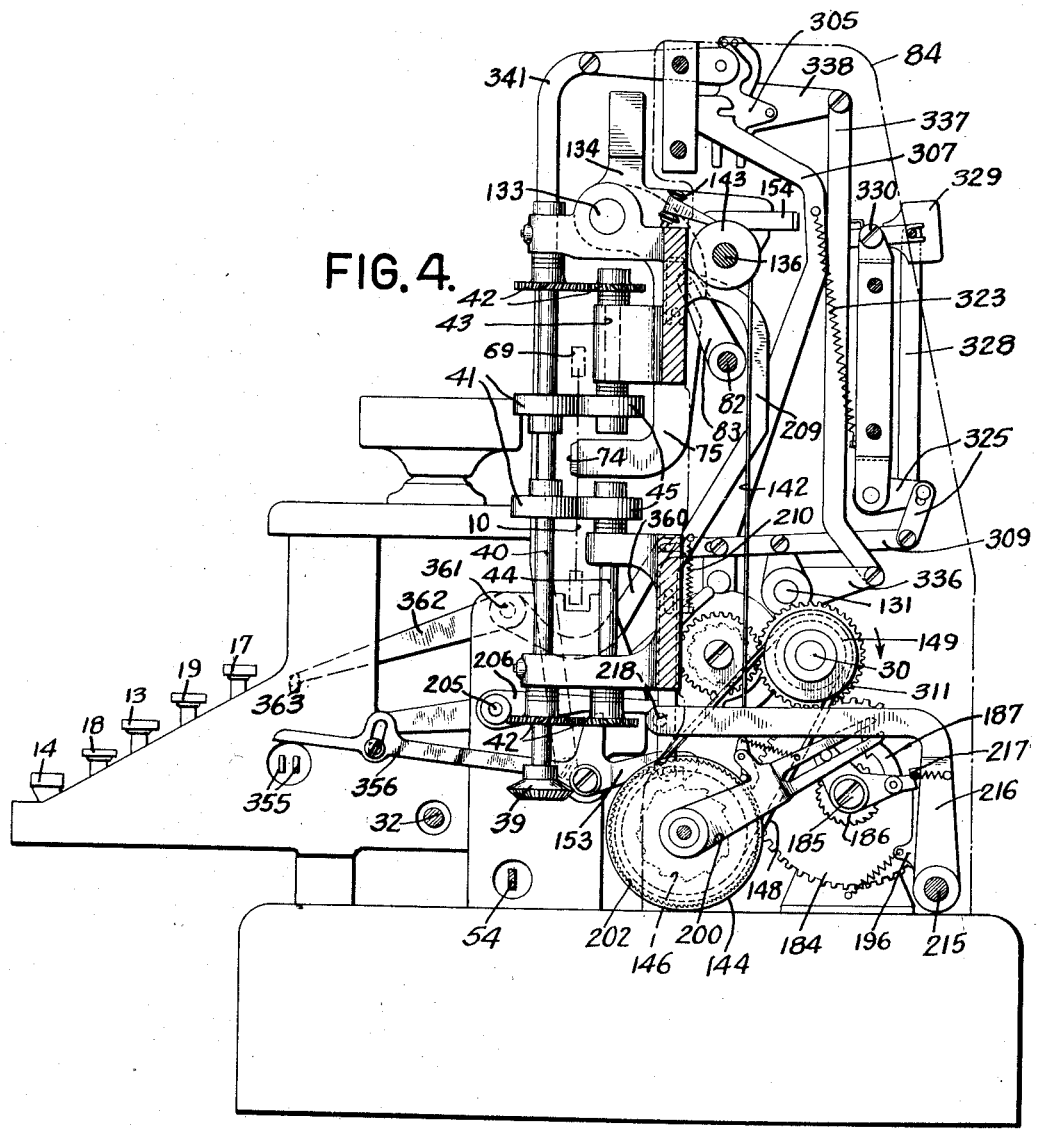

Power actuated back spacing mechanism is provided to move the card backward step by step when so desired. Referring now to Figs. 4, 12 and 13, the continually running pulley 147 has fixed to the side thereof a gear 183 meshing with a gear 184 on a stud 185. To the gear 184 is fixed driving element 186 of a clutch device with which a dog 187 cooperates when released by the back space key 15 in the following manner. Key 15 is mounted for operation in a familiar manner and has attached thereto a block 188 adapted when moved downwardly to rock a lever 189 through a spring pressed latch 190, see also Fig. 24. Lever 189 is loosely pivoted on a shaft 191 and at its rear end has pin and slot connection with an arm 192 fixed upon the end of a sleeve 193 which extends to the right side of the machine supporting at that end clutch-dog latching arm 194. A spring 195 (Fig. 12) tends to hold the parts in normal position. Depression of space key 15 thus releases dog 187 to engage continually running clutch element 186 to make one revolution at the end of which a toe on dog 187 will re-engage arm 194 to release the dog from element 186. The usual spring pressed rebound latch 196 may also be provided.

In order to prevent repeated back spacing due to prolonged depression of the key 15, a fixed pin 197 is provided which, as latch 190 is depressed, causes the latch to be cammed out of engagement with the block 188 so that spring 195 may rock the parts back to normal position. Dog 187 is pivoted on a bell crank arm 198 having a pin 199 cooperating with a slot in an arm 200 so that as dog 187 is moved by element 186 it will carry arm 198 also through one revolution which in turn causes arm 200 to oscillate through a definite angle. Upon the arm 200 is pivoted a spring pressed pawl 201 adapted when in position of Fig. 12 to be held out of engagement with a ratchet 202 mounted on the side of tape drum 144 by a pin 203.

Oscillation of the arm 200 will permit pawl 201 to engage the teeth of the ratchet and move the ratchet and attached drum 144 so that tape 142 which, as we have seen is attached to the right end of the carriage 76, will move the carriage to the right a distance equivalent to the space between adjacent columns of perforations.

Carriage return

In Fig. 36, in order to perforate the two horizontal fields of the card it will be necessary after one field has been perforated to return the card to starting position in order to commence perforating the first column of the other field; shifting the card vertically meanwhile.

If for this or any other reason the operator desires to restore the carriage to its starting position the carriage return key 18 is operated (see Figs. 2, 13, 15 and 23) and through a lateral extension on a lever 204 cooperating with the underside of the key rocks a rod 205. An arm 206 at the other end of rod 205 is thus rocked from the position shown in Fig. 15. The spring pressed latch 153, already described, is normally held out of engagement with the ratchet 146 by the arm 206 as shown and releases said latch as has already been explained, to cause drum 144 to draw the carriage to the right through tape 142. Mounted on one of the side arms 134 of the carriage 76 is a cam plate 207 (see also Figs. 16 and 26) adapted as the carriage approaches its initial position to engage a lateral extension 208 of a link 209 (see also Fig. 4) which link is mounted for vertical reciprocation on the frame of the machine. A spring 210 normally holds link 209 in its lower position wherein a pin 211 is out of engagement with latch 153. Raising of said link and pin by cam member 207 will lift latch 153 out of engagement with the ratchet 146 to interrupt further movement of the carriage toward the right.

As the carriage is returned to the right, its rack 154 (see Fig. 5) being in engagement with escapement pinion 157 will turn the pinion, but due to the spring-pawl connection to ratchet 158 the latter will not be disturbed and release of the carriage from actuation by tape 142 will again place it under control of pinion 157 and escape ratchet 158. To insure that rack 154 and pinion 157 are in engagement when tape 142 ceases to draw the carriage, a leaf spring 212 (see Figs. 2 and 42) is attached to the right hand frame in the manner shown with its free end forming a cam surface which is adapted to engage the right end of rack 154 to move it down.

*Automatic carriage return*

After the card has received as much information as it is desired to punch and print hereon, it will automatically be ejected from the machine in a manner already described which involves the rotation of shaft 47 through one revolution. Attached to cam 63 upon this shaft (see Figs. 2, 4, 15 and 24) is a pin 213 adapted after the completed card has been moved from the carriage 76 to engage a lever 214 mounted upon a shaft 215 rocking the shaft in a clockwise direction. At the right side of the machine, shaft 215 carries an L-shaped arm 216 spring urged against a stop pin 217 fixed to the frame of the machine. The free end of arm 216 carries a pin 218 projecting under the free end of arm 206 so that upon the rocking of shaft 215 by pin 213, arm 206 will be rocked in a counterclockwise direction to release latch 153 which thereupon causes the carriage 76 to be drawn to the right in a familiar manner.

*Positioning of card frame*

The card frame 67 is adapted to occupy either an upper or lower position as it guides the card across the machine to receive data in either of fields 11 or 12 as the case may be. The shift key 16 (Figs. 19, 20 and 22) is adapted to trip a half-revolution clutch to alternate the position of the card frame for successive operations of the shift key. The continually running shaft 30 carries a pinion 219 meshing with a gear 220 to which is attached a driving element 221 of a half-revolution clutch device. Depression of shift key 16 will through a pin 222 cooperating with the under edge of the key depress the free end of a lever 223 pivoted on the common rod 90. A pivoted lever 224 which carries a spring pressed latch 225 is adapted to be rocked in a counterclockwise direction by lever 223 so that, in turn, it will rock an arm 226 with which it has pin and slot connection. Arm 226 is fixed to a rod 227 upon which is also fixed clutch releasing arm 228 held upwardly in engagement with either of two stops 229 by a spring 230. The two stops are connected by a link 231 and one of said stops is integral with spring pressed pawl 232 so that depression of shift key 16 by actuating clutch releasing arm 228 will permit the pawl 232 to be drawn into engagement with the element 221. Pin 233 is adapted to cam the latch 225 out of engagement with lever 223 to immediately release the parts so that the arm 228 may disengage the clutch after 180 degrees of movement. The stops 229 are pivotally mounted upon a member 234 secured to a shaft 235 upon which is also carried a cam 236. A cam follower roller arm 237 loose on shaft 131 has a roller cooperating with the cam 236 and through a spring 238 is adapted to resiliently actuate an arm 239 fixed to said shaft. Also fixed to shaft 131 is a pair of arms 240 cooperating with pins 241 spaced as seen in Fig. 7 and secured to the card frame 67 so that as the shaft 130 is rocked the frame 67 is shifted.

With the parts in the position of Fig. 19, depression of the shift key 16 will move the parts and raise the frame to the position of Fig. 20 from which a second depression of key 16 will return the parts to the position of Fig. 19.

As we have noted in connection with the arrangement of the card as shown in Fig. 36, the field 12 is adapted to receive only information in the form of digits which employ only four index point positions. In order to obviate the possibility of actuating any but digit keys when the card is in raised position a locking plate 242 is provided (see Figs. 18, 20 and 21). The plate 242 is provided with a series of notches in alinement with the keys 13 which represent digital values and when rocked to the position of Fig. 20 is adapted to block all other keys 13 against operation. This plate is mounted upon a rod 243 journalled at the sides of the typewriter frame and having at one end an arm 244 connected by a link 245 to an arm 246 loosely pivoted on a shaft 247. Intermediate the link 245 and the shaft 247 lever 246 carries a vertical member 248 slotted at its upper end to engage the card frame 67. A spring 249 is adapted to urge member 248 upwardly into engagement with the lower edge of frame 67 so that as the frame rises to present the lower field of the card to the punches member 248 will follow to a sufficient extent to rock plate 242 into locking engagement with all keys 13 not representing digital values.

*Operation of the eject key*

When operations upon the card under consideration are complete and it is desired to remove it from the punching section of the machine and to introduce a new card in position to receive entries, the ejector key 19 is operated. The operations initiated by the ejector key may vary depending upon the location of the card in the machine at the time the key is depressed. For instance, if the card is in its raised position at the time, it will be necessary to first go through a shift cycle bringing the card down to its normal position before it can be relayed to the discharge hopper.

Referring to Figs. 18, 19 and 20, the ejector key 19 through a block 250 actuates a spring pressed latch 251 mounted upon an arm 252 fixed to shaft 247. The usual pin 253 is also provided to cooperate with latch 251 to prevent prolonged depression of said latch. An arm 254 secured to shaft 247 carries a hook 255 adapted to cooperate with a block 256 attached to lever 223 so that at the time when ejector key 19 is depressed rocking the shaft 247, if the hook 255 is in the position of Fig. 20, the lever 223 will be actuated to shift the card frame to its lowered position. The position of the hook 255 is governed by the location of the card frame. With the card frame in its upper position as shown in Fig. 20 a member 257 having pin and slot connection with member 248 and having also a pin 258 in one arm thereof, permits the hook 255 to tilt clockwise into engagement with the block 256. With the frame in its lowered position the parts assume a relationship as in Fig. 19 with the pin 258 holding the hook 255 out of active cooperation with the block 256.

Returning to Fig. 18, shaft 247 carries a short arm 259 which is adapted through a spring 260 to rock an arm 261 and therethrough shaft 191. If shaft 191 is restrained from following the urge of spring 260 at this time a latching arm 262 also secured to shaft 247 is adapted to be held in its counterclockwise position as in Fig. 25 by a spring urged latch 263 loose on shaft 215 and adapted to swing under the arm 262 when the latter is rocked by shaft 247. This then holds the spring 260 tensioned in readiness to actuate the shaft 191 when the latter is released.

One of the conditions which may hinder the clockwise movement of shaft 191 may be the cooperation of the hooked end 264 of the lever 246 with a lateral extension of a latch 265, mounted on shaft 191. The hook 264 assumes latching relationship with the latch 265 when the parts are in the position of Fig. 20 with the frame 67 in upper position. The latch 265 may also be blocked against rotation until the card carriage occupies a position with the last column in line with the punches. In such position the escapement rack 154 of the carriage 76 (see Fig. 33) is adapted to engage an arm 266 rocking it against its spring 267 and through a rod 268 (see also Fig. 6) rock a depending arm 269 which has connection at its lower end with a link 270 (Fig. 24). The other end of link 270 by connection with a lever 271 is adapted to rock the free end of said lever out of cooperation with the latch 265 permitting the same to rock. Thus we see that before shaft 191 may be operated to initiate an eject cycle, the card must first be brought to a position wherein the last column of its upper field is in cooperation with the punches; thus bringing the leading edge of the card between the already described eject rollers.

The left end of shaft 191 carries clutch releasing arm 272 and its accompanying rebound latch which cooperate with an arm 273 carrying clutch dog 274. Continually running shaft 30 through gears 275 is adapted to keep in constant rotation a clutch driving element 276 so that when the shaft 191 is finally permitted to rock in clockwise direction as viewed in Fig. 18 to release the dog 274 the latter will be urged by its spring into engagement with element 276 to cause the eject shaft 47 to make one revolution. Shaft 47 carries several cams whose various functions have already been described.

Briefly, the machine is adapted firstly, during this eject cycle to advance the card to its final position, if it is not already there; secondly, to withdraw the card from the card frame and propel it into the discharge hopper after the feeding fingers have been moved out of engagement with the leading and trailing edges of the card; thirdly, the card carriage is automatically moved to the right of the machine; and fourthly, a new card is advanced from the new card hopper into position in the card carriage to receive data. When shaft 215 (Fig. 25) is turned clockwise to initiate a carriage return operation a pin 215a therein will coact with one shoulder of a notch in the hub of latch 263 rocking the same clockwise. This releases arm 262 and permits the shaft 247 to return to normal position.

As the ejected card is advanced into the discharge hopper 21 (see Figs. 2 and 6) a pair of plates 278 pivoted on the rod 52 are adapted to swing toward the rear of the machine out of the path of travel of the card and after the card has fully entered, the plates are adapted to move forwardly against its rear edge to move the same out of the path of travel of the next succeeding card.

The mechanism involved in this operation comprises a cam 279 mounted on the shaft 47 cooperating with a roller 280 attached to the free end of a slide 281. Slide 281 is connected to a pivoted lever 282 whose other end is connected on a lever pivoted on a vertical rod 283 at whose upper end is an arm having link connection to the plates 278.

In Fig. 5 the rocking of shaft 247 due to depression of ejector key 19 causes an arm 284 thereon to rock a pivoted lever 285 through pin and slot connection. The outer end of lever 285 is connected by a link 286 to the governor 329 (see also Fig. 10) whose function, as will later be described in detail, is to disengage the carriage 76 from the escapement mechanism and permit it to advance at a speed controlled by said governor.

In Fig. 6 an inclined bar 287 is provided over which the discharged cards 10 are pushed by plates 278 to drop behind the edge thereof where they remain out of the path of any subsequently incoming card.

Column skip mechanism

It is often desirable to skip certain fields of the card in which information may previously have been gang punched or it may be desired to leave these particular columns blank. For this purpose the so-called tabular key 17 is provided. It is the function of this key to release the carriage from the control of the step by step mechanism and permit it to advance until arrested by cooperation of an adjustable stop on the carriage with a relatively fixed stop on the frame of the machine. In Fig. 7 the carriage 76 is shown as being equipped with an indexed tabular bar 300 having the usual column designating notches. Slidably engaging these notches may be placed stops 301 having projections 302 and 302a (see also Figs. 17, 31 and 32). A stop arm 303 is adapted to be rocked from the midposition it occupies between projections 302 and 302a into cooperation with either of the projections depending upon which field of the card is presented to the punches. If the lower field of the card is active, the arm 303 is adapted to rock counterclockwise to engage stop 302, and if the upper field is active, stop 303 turns clockwise to engage stop 302a. The arm 303 (see also Fig. 30) is secured to a shaft 304 on the opposite end of which is secured a double armed lever 305 having pins 306 and 306a. The upper, free end of a link 307 is provided with notches adapted to engage either of the pins 306 or 306a to rock the shaft 304. With the parts in the position of Fig. 17 it will be recalled that when the upper field of the card is being punched the shaft 131 is in its counterclockwise position so that through an arm 308 attached to shaft 131 and a link 309 cooperating with a pin 310 in the arm 307, the upper end of the latter is held to the left in cooperation with the pin 306a.

When the card frame is shifted to present the lower field to be punched, shaft 131 assumes its clockwise position drawing with it, through the same connections the arm 307 so that now its upper end cooperates with the pin 306. Continually running shaft 30 through gearing 311 (see also Fig. 23) drives a clutch element 312 mounted upon a stud 313. The key 17 has a circular opening within which is freely disposed a pin 314 reaching from a lever 315. One arm of the lever 315 carries a by-pass latch 316 adapted, upon actuation of the key 17, to rock a hook 317 out of cooperation with a member 318 one arm 319 of which serves to hold the spring pressed dog 320 out of cooperation with the clutch element 312. Engagement of dog 320 with element 312 will cause a cam 321 to turn and move arm 307 upwardly through roller 322 thereon against the action of spring 323. This as we have seen will rock the stop arm 303 clockwise into the path of stop projection 302a. Upward movement of arm 307 will rock the link 309 clockwise about its connection to arm 308 to draw downwardly on an arm 324 through a link 325. Arm 324 is connected to a shaft 326 which also carries a dog 327 having a link 328 extending vertically to a governor 329 (see also Fig. 10). The resultant downward movement of the governor 329 about its pivot 330 will tilt a ratchet-shaped pinion 331 into cooperation with rack 154 raising the rack out of engagement with escapement pinion 157 so that the carriage is free to move to the left under the influence of tape drum 141. The pinion 331 is connected to the usual centrifugal weight contained in governor 329 to regulate the rate of advance of the carriage.

Leaf spring 332 is adapted to cushion excessive upward movement of rack 154 and prevent its passing out of engagement with pinion 331.

As the cam 321 revolves, the pivot stud of dog 320 is adapted to engage an arm 333 to positively restore the clutch releasing member 318 to insure but a single revolution of the device. The flexible by-pass 316 permits restoration of key 17 and member 315 without disturbing the latch 317.

Automatic column skip mechanism

Means are also provided whereby certain columns of the card may be skipped without actuation of a key by the operator. Certain stops 301 may be provided with upwardly extending projections 334, 334a (see Figs. 31 and 32) cooperating with by-pass 335. This by-pass is adapted when operating on the upper field of the card to be positioned in the plane of travel of the stop 334a as in Fig. 31 and when the lower field of the card is being punched to lie in the plane of travel of the projection 334. In Fig. 17 an arm 336 on shaft 131 through a link 337 (see also Fig. 30) is adapted to rock a frame 338 through an arm extending rearwardly therefrom. This frame carries a rod 339 upon which is pivoted an arm 340 which carries at its free end the by-pass 335. Thus the by-pass 335 will move from cooperation with the projection 334a into cooperation with the projection 334 accordingly as upper or lower fields of the card are in position to receive entries. As the carriage travels step by step across the machine either of the projections will engage the by-pass 334 and through arm 340 rock the rod 339 in a clockwise direction. This will raise a link 341 through an arm 342 also fixed to rod 339. The lower end of link 341 has connection to an arm of member 315 and is adapted to actuate the member in the same manner as though tabular key 17 had been depressed. The connection between pin 314 and key 17 is such that the automatic operation thus described does not disturb the key.

Signal of position of card carriage

A signal bell 343 (Figs. 30, 31 and 32) is adapted to be sounded when the card carriage has reached a predetermined position. For this purpose other stops 301 are provided with projections 344 and 344a adapted to actuate a by-pass 345 pivoted upon a link 346 (see also Fig. 7). Link 346 is attached to an arm 347 loose upon rod 339 and is adapted to position the by-pass 345 in either the plane of travel of projection 344a or 344 in a familiar manner accordingly as the card is in upper or lower position. Thus as the carriage moves to the left and the by-pass 345 is raised by either of the projections, a spring pressed hammer 348 is raised and permitted to fall against bell 343 as the carriage moves out of cooperation with by-pass 345. As may be noted in Fig. 7 the by-pass 345 and also the by-pass 335 are not actively affected by movement of the carriage toward the right.

Further control of the card carriage

When the card carriage is in its extreme left hand position presenting the last column to the punches, it is desirable to disable the escapement mechanism in order to prevent accidental displacement of the parts. To this end a camming plate 350 is attached to the carriage and adapted when the carriage arrives at the last punching position to cam member 165 about its pivot and against its spring 169 to remove it from operating engagement with pin 166 of the escapement member 163.

As the carriage approaches the extreme left position (see Fig. 7) one of the side arms 134 will contact a resilient bumper 351 to absorb the impact.

When the carriage is returned to its initial position the other side arm 134 is adapted to engage one end of a lever 352 (see also Figs. 2 and 3) the other end of which has connection to the piston of a dash pot 353 to assist in decelerating the carriage.

Key interlock

In Fig. 38 all of the manually operated key levers have extensions cooperating with disks 354 which in a manner well known in the art prevent the depression of more than one key at a time, also preventing depression of a second key before the first one has returned to normal position. The carriage return key 18 and the ejector key 19 have cooperating therewith the supplemental spring pressed latches 355 adapted to engage the depressed key lever and hold it in such position until the completion of the particular cycle it may have initiated. Such continued depression, as may be noted, will prevent the actuation of any other key through the cooperation of the disks 354. In the case of the latching of the carriage return key, such key will not be released until the carriage has reached its initial position, and in the case of the depression of the ejector key it also will not be released until the carriage has again reached initial position.

As we have already seen in connection with Figs. 4 and 15, when the carriage reaches such position, link 209 is moved upwardly to disengage the latch 153 from the ratchet 146. Latch 153 has integral therewith an arm 356 whose forward end is adapted to cooperate with lateral extensions of the latches 355 to release the same and permit the keys to return to their normal position. The latches 355 are normally held out of cooperation with the key levers 18 and 19 by the arm 356 and moved into cooperation with their key levers when the carriage return clutch is depressed.

The key lever 17 (Figs. 38, 39, and 40) is adapted when depressed to move from the position of Fig. 38 to that of Fig. 39 where a spring pressed bell crank latch 357 snaps over the top thereof, permitted to do so by the rocking of a member 358 out of cooperation with the lateral extension 359 of the latch 357.

Referring now to Fig. 17, we have seen that after the clutch dog 320 has been tripped to cause rotation of the cam 321, arm 307 has been raised carrying therewith link 309. This link has pin and slot connection at its left end with a goose-neck lever 360 pivoted upon a rod 361 to which is also attached an arm 362 (see also Figs. 4 and 41). The action is such that after the tabulating cycle has been commenced, arm 362 is rocked counterclockwise so that a camming projection 363 at the free end thereof will engage a pin 364 in the upper end of latch 357 moving the latch to the position of Fig. 40 releasing the key lever 17. In order to prevent relatching of key lever 17 due to prolonged depression thereof, the projection 359 of the latch 357 is adapted upon the aforementioned release of the latch to be held in its clockwise position by a latch 365. The shoulder of the latch 365 which now engages the projection 359 is slightly higher than the shoulder on member 358 so that as the key 17 is later permitted to restore and the member 358 turns in a counterclockwise direction to follow the key lever 17, the projection 359 will ride from the shoulder of latch 365 to the shoulder 358 returning the parts to the position of Fig. 38.

Printing ribbon vibrator

As in the operation of typewriting machines it is desirable to have the ink-ribbon move out of alinement with the hammer and platen to permit visibility of the character printed. In Figs. 1, 5, 8 and 37 the ink-ribbon 366 is threaded through the usual vibrator 367 normally urged downward by its spring 368 to move the ribbon out of alinement with the platen. The upper end of the vibrator is yieldingly connected by the spring 369 to a lever 370 secured to the rod 113 and having link and lever connection 371 to a slide 372 which slide has a series of projections 373 cooperating with the code bails 107 (see also Fig. 10). As may be recalled the bails 107 are actuated only under control of a significant character key and will thus through the connection just described, raise the vibrator 367 to bring the ribbon into printing alinement.

Disk or chip conveyor

To prevent the disks or chips punched from the cards from being scattered in the machine or on the floor, a conveyor is provided which comprises an open coil spring 374 (see Figs. 7, 8, 19 and 22) resting in a tube 375 having a tongue 376 positioned beneath the punches 110. At one end of the spring there is attached a gear 377 connected by gears 378 to the continually running shaft 30. The chips are fed by the spring 374 to the right of the machine as viewed in Fig. 7. where they fall through a vertical flue 379 which conducts them to the under side of the machine where they may be collected.

To prevent the chips from accumulating at the die openings, a member 380 having a series of protuberances is provided. Member 380 is attached to the ribbon vibrator 367 and moves up and down therewith.

Ribbon feeding mechanism

The ribbon feeding mechanism herein disclosed is of the type familiar in the art and will be but briefly discussed. In Fig. 5 the shaft 128 carries an arm 381 (see also Fig. 10) which through a link 382 is adapted to rock a sleeve 383 whenever shaft 128 is operated. In Fig. 35 the sleeve 383 has an arm 384 adapted to actuate a sliding plate 385 mounted for reciprocation on a stud 386. A projection 387 of plate 385 is adapted to engage a sliding pawl 388 to cause the same to space the ribbon spool ratchet 389. A holding pawl 390 upon which the actuating pawl 388 is mounted for reciprocation is also provided. It will be understood, of course, that the other ribbon spool actuating mechanism on the opposite side of the machine is similar in structure but has its actuating pawl held out of engagement with its ratchet. The ribbon spool shown in Fig. 35 has one end of the ribbon 366 so wound thereon that a member 391 is held in the position shown. As ribbon feeding progresses and the companion spool of that shown in Fig. 35 unwinds, the member 391 on such spool will ultimately be released and a bent rod 392 extending upwardly into engagement with one side of the member 391 will be permitted to move downwardly.

The lower end of this rod 392 has a grooved collar 393 in which there is positioned an arm of a pivoted member 394. Another arm of this member carries a pin 395 normally in a position as in Fig. 35 out of cooperation with its sliding plate 385, bearing in mind that the position of the parts of the spool under consideration occupy a position which is the reverse of that shown in Fig. 34. The dropping of the pin 395 due to failure of the ribbon on that spool will permit its sliding plate 385 to engage its pin 395 rocking its member 394 and the member 396 so as to permit its pawls 388, 390 to move into active cooperation with its pawl 389. This movement of the member 396 will through a pin and lever connection 397 draw a rod 398 downwardly as viewed in Fig. 34 to act in a reverse order upon the parts 396 and 394 of Fig. 34 to move the pawls 388 and 390 of said member out of cooperation with the ratchet 389. Member 396 has an upstanding projection 399 which engages the pawl 390 as seen in Fig. 35, to pivot the same out of cooperation with the ratchet.

Summary of operation of machine

Blank cards are placed in the magazine 20 (Figs. 1 and 2). The eject key 19 is then depressed to bring the parts to starting position, feeding a card from the magazine into the card carriage. The card is now in position with the first column of the upper field 11 in position to be punched. The operator may now manipulate the keys 13 to enter alphabetical or numerical characters on the card as it is moved step by step to the left of the machine. At any point the shift key 16 may be depressed to raise the card to present the lower field for punching and a second depression of the shift key will return the card to again receive information in the upper field. Columns may be skipped one by one through depression of space bar 14 and if occasion requires back space key 15 will retract the card step by step.

In the event it is desired, say, when the upper field has been partially completed to shift to the lower field and commence in the first column thereof, successive depression of shift key 16 and carriage return key 18 will give the desired result. Or key 18 may be operated before key 16 to the same end.

If automatic operation is desired stops 301 will have been suitably located on bar 300 so that when the selected columns approach the printing and punching position, tabulating will take place without further effort on the part of the operator, who if adjustment is made will also be apprised by signal when a certain predetermined column in either field has been reached.

When the card is completed the operator may depress the ejector key 19 which causes the prepared card to be removed to the discharge pocket 21 and a new card to be advanced into position for entry thereon.

While there has been shown and described and pointed out the fundamental novel features of the invention as applied to a single modification it will be understood that various omissions and substitutions and changes in the form and details of the device illustrated and in its operation may be made by those skilled in the art without departing from the spirit of the invention. It is the intention therefore to be limited only as indicated by the scope of the following claims:

1. In a machine of the class described, type bar actuating mechanism, punches, a constantly running actuator, coupling devices between said punches and said actuator, means controlled by said type bar actuating mechanism to move said coupling devices into cooperation with said actuator and means controlled by said actuator for causing positive operation and retraction of said punches.

2. In a typewriting perforator, type bar actuating mechanism, punches, and an actuator therefor, a translator controlled by said type bar actuating mechanism means controlled by said translator to couple said punches and actuator for operation and means controlled by said actuator for causing positive operation and retraction of said punches.

3. In a typewriting perforator, type bar actuating mechanism, punches, a translator controlled by said type bar actuating mechanism and means controlled by said translator to cause positive actuation of said punches in both directions.

4. In a machine of the class described, type bar actuating mechanism, a plurality of punches having in combination therewith an actuator, selector devices operable by said actuator when selected by said type bar mechanism for displacing one or more selected punches through record material and a restoring device also operable by said actuator for positively restoring the said punches.

5. In a machine of the class described having type bars, punches, and an actuator, connecting means to connect said type bars to said actuator for operation and means controlled by said connecting means to cause actuation of said punches.

6. In combination, punches, type bar actuating mechanism, a plurality of actuating elements, means connecting said elements to said punches for causing advancement and retraction of said punches upon operation of said elements, and means controlled by said type bar actuating mechanism to operate said elements.

7. In combination, a type bar, means for actuating said type bar, a plurality of punches, constantly running means, coupling devices between said punches and said constantly running means, a plurality of elements individually associated with said punches, and means controlled by said type bar actuating means to cause operation of one or more of said elements, and further means controlled by said elements to cause cooperation between said constantly running means and said coupling devices to operate the selected punches.

8. Claim 7 in which said constantly running means and said coupling devices cooperate to positively actuate the selected punches in one direction for punching and to positively actuate said punches in the reverse direction for restoring said punches.

9. In combination, a type element, actuating means therefor, a plurality of punches, a plurality of elements individually associated with said punches to cause actuation thereof in both directions and means operated by said type element actuating means to cause selective operation of one or more of said elements to actuate the punches.

10. In a machine of the class described, a type element actuating means therefor, a converting device to receive entries therein as an incident to the actuation of said type element, punches, and means controlled by said converting device to cause operation of said punches in both directions.

11. In a machine of the class described, a type element, a constantly running actuator therefor, means to couple said type element to said actuator, a converting device to receive entries therein as an incident to said type element actuation, punches and an actuator therefor and means controlled by said converting device to cause actuation of said punches by said actuator.

12. In a machine of the class described, a punch selecting element, an actuator therefor, means to connect said punch selecting element to said actuator and resilient stopping means for said connecting means when said punch selecting element is disconnected from said actuator.

13. In combination, a plurality of individually movable keys, a constantly running actuator therefor called into action by the operation of any of said keys for printing a character corresponding to that key upon a record sheet, and power actuated means called into action by the operation of any of said keys for perforating the record sheet to produce a combination arrangement of perforations corresponding to the character printed.

14. In a sheet perforating machine, a laterally movable carriage for supporting a sheet to be punched, punches, means for advancing said carriage step by step relative to said punches, means for actuating the punches to perforate the sheet and key actuated means for returning said carriage step by step.

15. Claim 14 in which said key actuated means comprises a constantly running actuator called into action to return said carriage step by step.

16. In combination a column of punches, a record sheet, a movable carriage therefor adapted to present a record to said punches, a record sheet hopper, a key, means called into action by said key to remove the record sheet from said carriage and means to feed a record sheet from said hopper into said carriage and into cooperation with said punches.

17. In a machine of the class described a column of punches, a carriage, means for advancing said carriage past said punches and frictional means normally in active position to prevent retrograde movement of said carriage relative to said punches.

18. In a record perforating machine, a supporting guide, a single column of punches, means for actuating the punches for perforating a record supported by said guide, a continually rotating actuator, and means for coupling said guide to said actuator, to cause movement of said guide in a direction parallel to said column of punches.

19. In a record perforating machine, a supporting guide, a column of punches, means for actuating the punches for perforating a record supported by said guide, a continually rotating actuator, a key and means controlled by said key to cause coupling of said guide to said actuator to cause movement of said guide in a direction parallel to said column of punches.

20. In a record perforating machine, a supporting guide, a column of punches, means for actuating the punches for perforating a record supported by said guide, a continually rotating actuator, a half-revolution clutch associated therewith, means for coupling said guide to said clutch and means to connect said clutch to said actuator to cause movement of said guide in a direction parallel to said column of punches.

21. In a record perforating machine, a supporting guide, a column of punches, means for actuating the punches for perforating a record supported by said guide, a continually rotating actuator, and means for coupling said guide to said actuator to cause movement of said guide in the direction of said column of punches, and further means operative as an incident to a repeated operation of said coupling means for causing movement of said guide in a reverse direction.

22. In a record perforating machine, a supporting guide, a column of punches, keys for causing selective actuation of said punches for perforating a record supported by said guide, a carriage for feeding a record for column spacing, means for shifting a record relatively to said carriage in a direction normal to the direction of said spacing and means called into action by said shifting means to prevent operation of said keys.

23. In a perforating machine, a column of punches, a card guide, means for shifting said guide in a direction parallel to said column of punches, and adjustable stops for locating said guide in shifted position whereby said punches may be in accurate alinement with a record card carried by said guide.

24. In a perforating machine, a column of punches, a card carriage, escapement mechanism adapted to permit step-by-step movement of said carriage past said punches, means for simultaneously actuating said punches and escapement mechanism, and means controlled by said carriage for rendering said actuating means ineffective to operate said escapement mechanism.

25. In a record perforating machine, a column of punches, a record card guide positionable in a direction parallel to said column of punches to present a plurality of fields to said punches, a card carriage and means for moving the same transversely to said column of punches to successively present the columns of the record card to said column of punches, a plurality of stops carried by said carriage and separately associated with the several fields of the record; a signal device adapted to be controlled by said stops to indicate the relative position of said carriage and means controlled in accordance with the positioning of said guide for rendering the stops corresponding to the field presented effective for operating said signal.

26. In a record perforating machine, a column of punches, a record card support, means for controlling the movement of said support to move a record card in a direction parallel to said column of punches and also transversely thereto, a signal device for indicating the transverse position of a record, operating means for said signal associated with each parallel position of the record and means for selectively calling the operating means into action.

27. In a record preparing machine having a carriage movable step by step, means for moving a record carried by said carriage in a direction transverse to the step by step movement of the carriage, a plurality of tabulating stops, a limiting stop adapted to cooperate with said tabulating stops to locate said carriage and means controlled in accordance with the transverse movement of the record for selectively calling said tabulating stops into operative relation with said limiting stop.

28. In a record perforating machine, a column of punches, a record card support, means for controlling the movement of said support to move a record in a direction parallel to said column of punches and also transversely thereto, a tabulating device for causing rapid transverse movement of the record, a plurality of tabulating stops for operating said tabulating device and means controlled in accordance with the parallel position of the record with respect to the column of punches for selectively calling said stops in action to operate said tabulating mechanism.

29. In a machine of the class described comprising in combination perforating punches, printing type, ink ribbon mechanism for said type, means for causing concurrent operation of said type and said punches, and means controlled by the operation of said punches for controlling the operation of said ink ribbon mechanism.

In testimony whereof I hereto affix my signature.

JOHN ROYDEN PEIRCE.